July 28, 1931.                H. A. WEBSTER                1,816,103
              PRINTING OF FLOOR COVERINGS AND THE LIKE
                    Filed Aug. 26, 1929    25 Sheets-Sheet 1

INVENTOR

July 28, 1931.  H. A. WEBSTER  1,816,103
PRINTING OF FLOOR COVERINGS AND THE LIKE
Filed Aug. 26, 1929    25 Sheets-Sheet 2

A'' | E'' | D'' | C'' | B'' | A''

A''' | D''' | C''' | B''' | A'''

INVENTOR

July 28, 1931.    H. A. WEBSTER    1,816,103
PRINTING OF FLOOR COVERINGS AND THE LIKE
Filed Aug. 26, 1929    25 Sheets-Sheet 3

INVENTOR

July 28, 1931. H. A. WEBSTER 1,816,103
PRINTING OF FLOOR COVERINGS AND THE LIKE
Filed Aug. 26, 1929  25 Sheets-Sheet 4

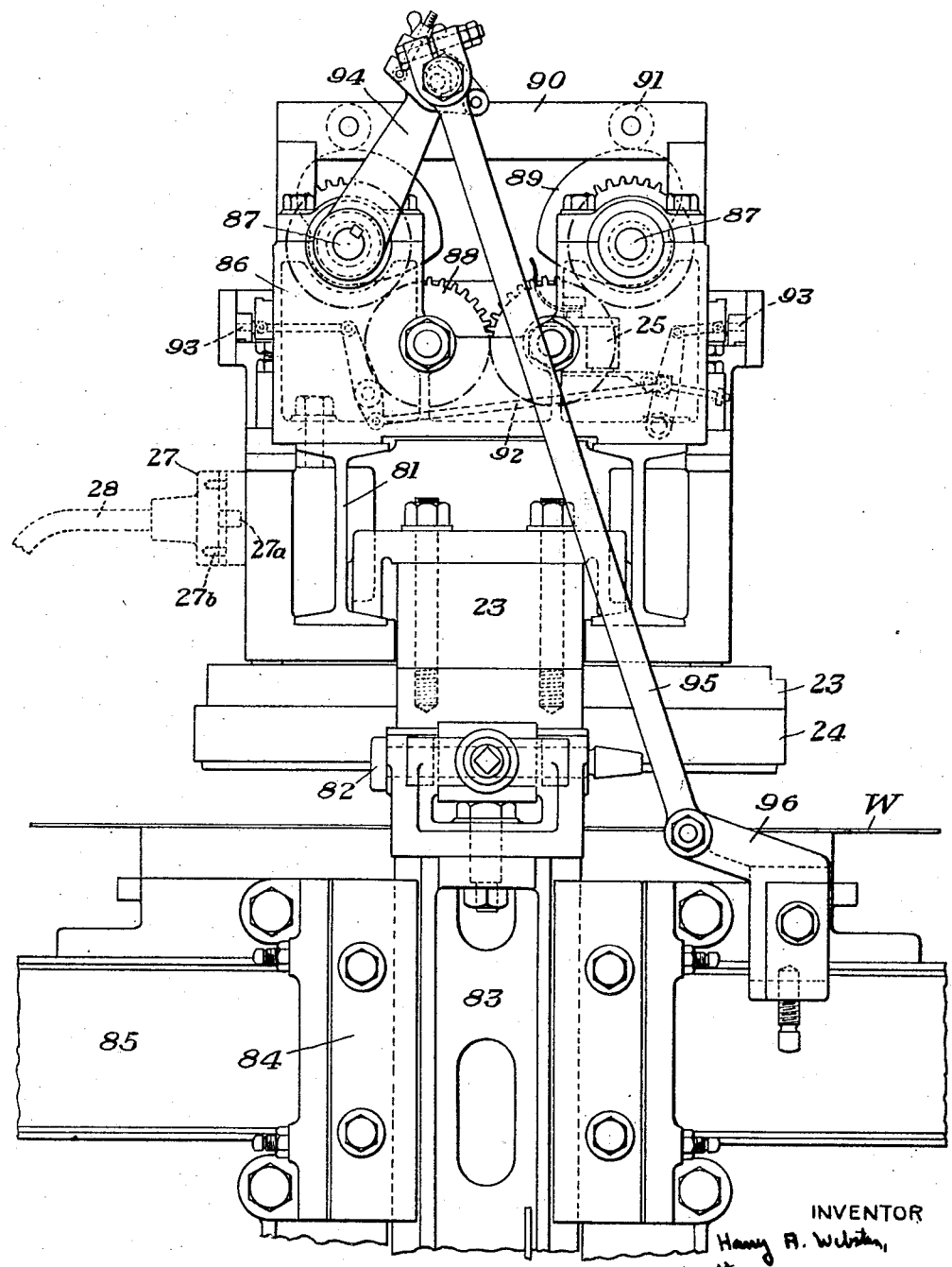

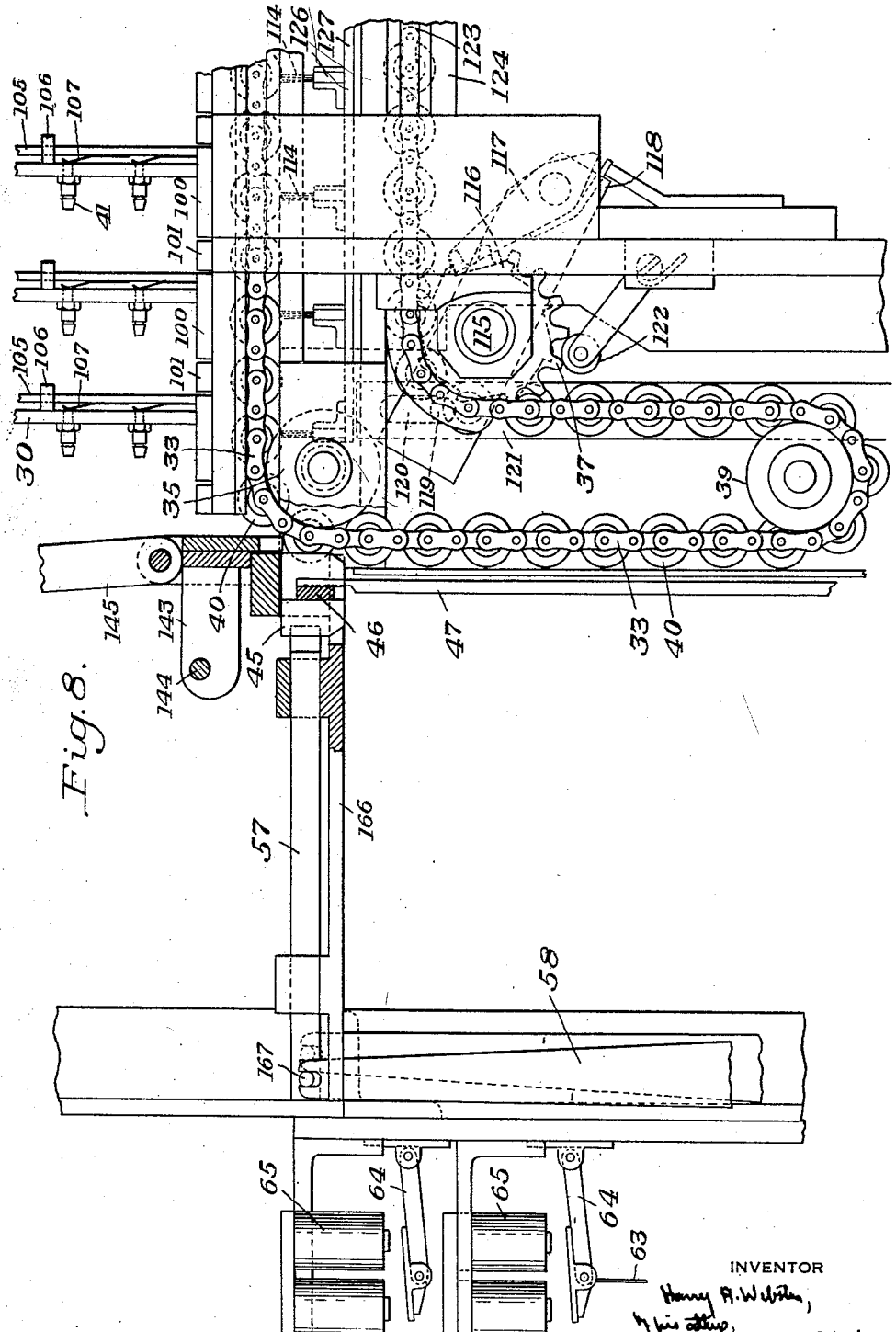

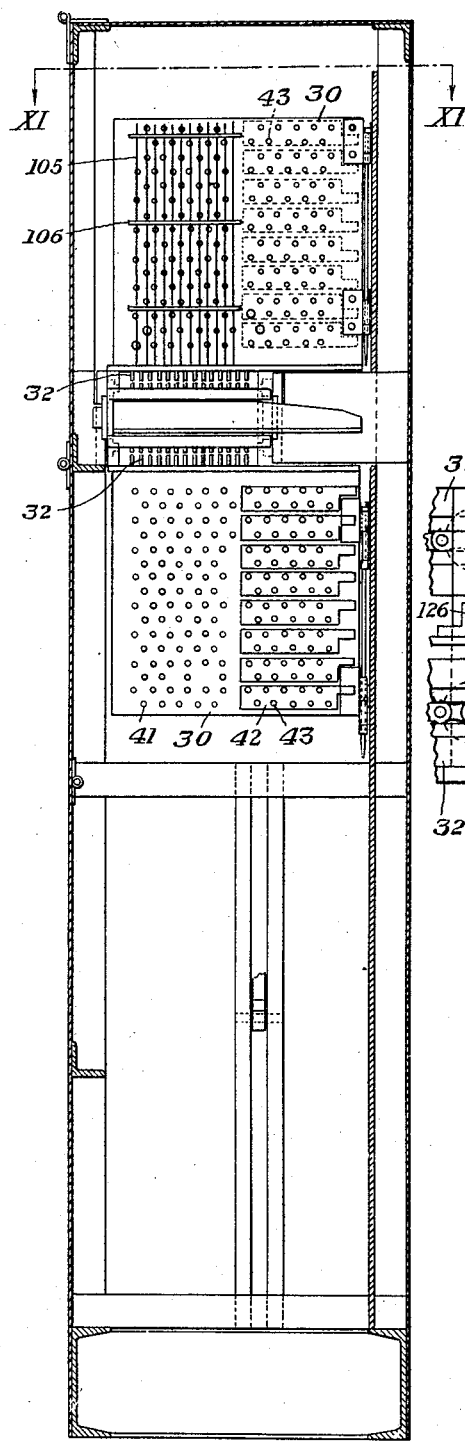
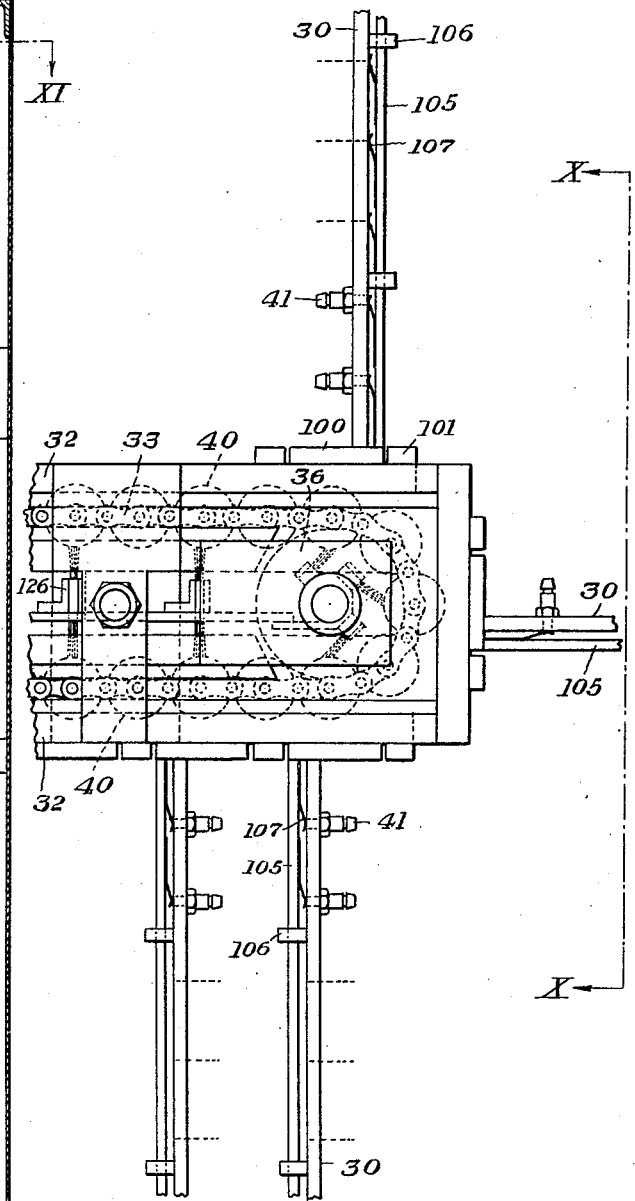

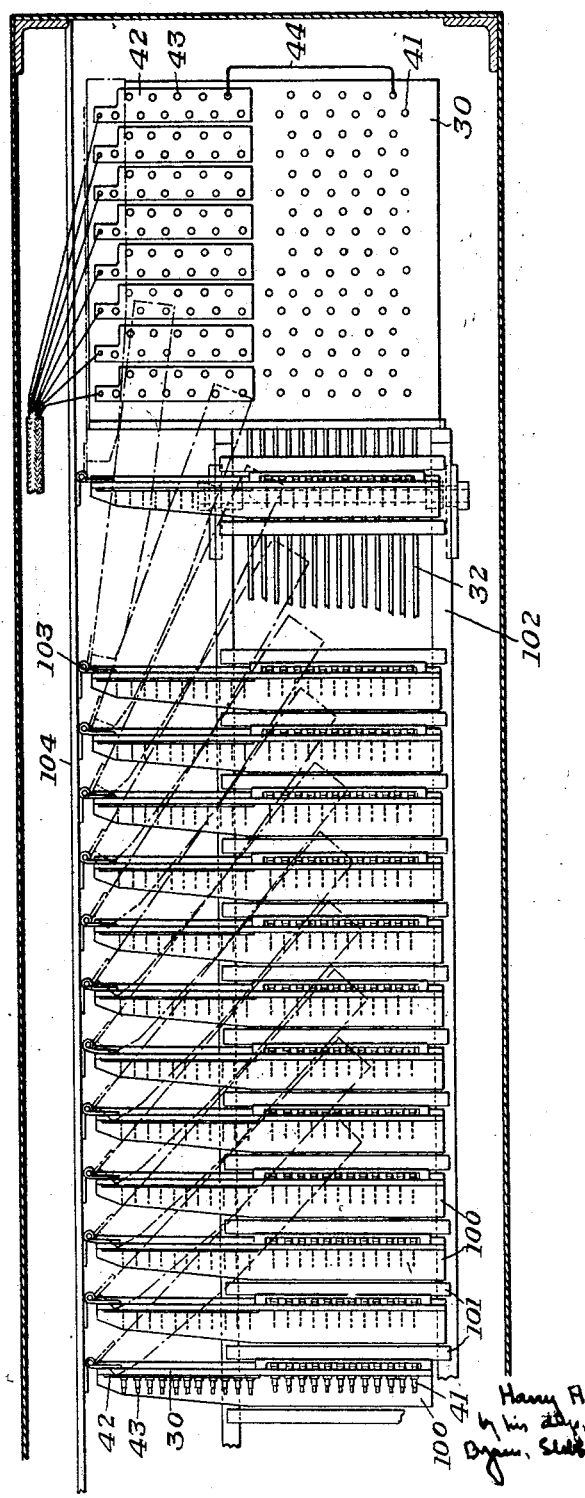

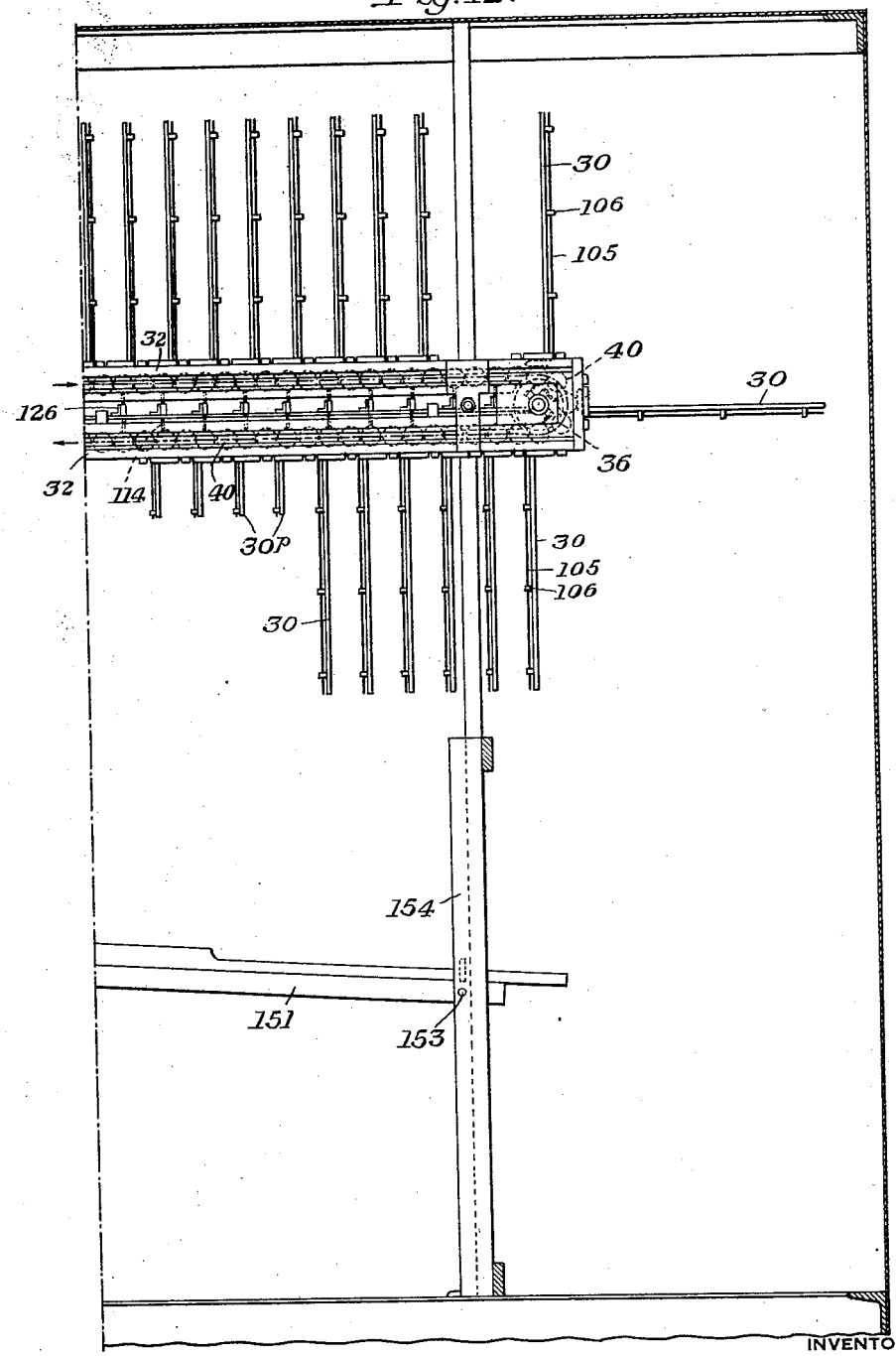

July 28, 1931.  H. A. WEBSTER  1,816,103
PRINTING OF FLOOR COVERINGS AND THE LIKE
Filed Aug. 26, 1929   25 Sheets-Sheet 10
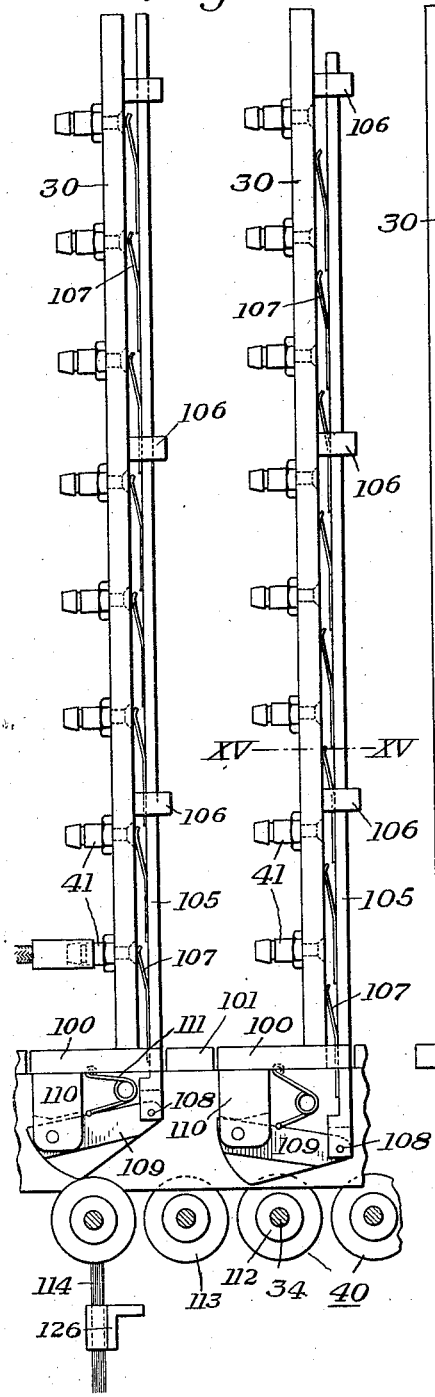
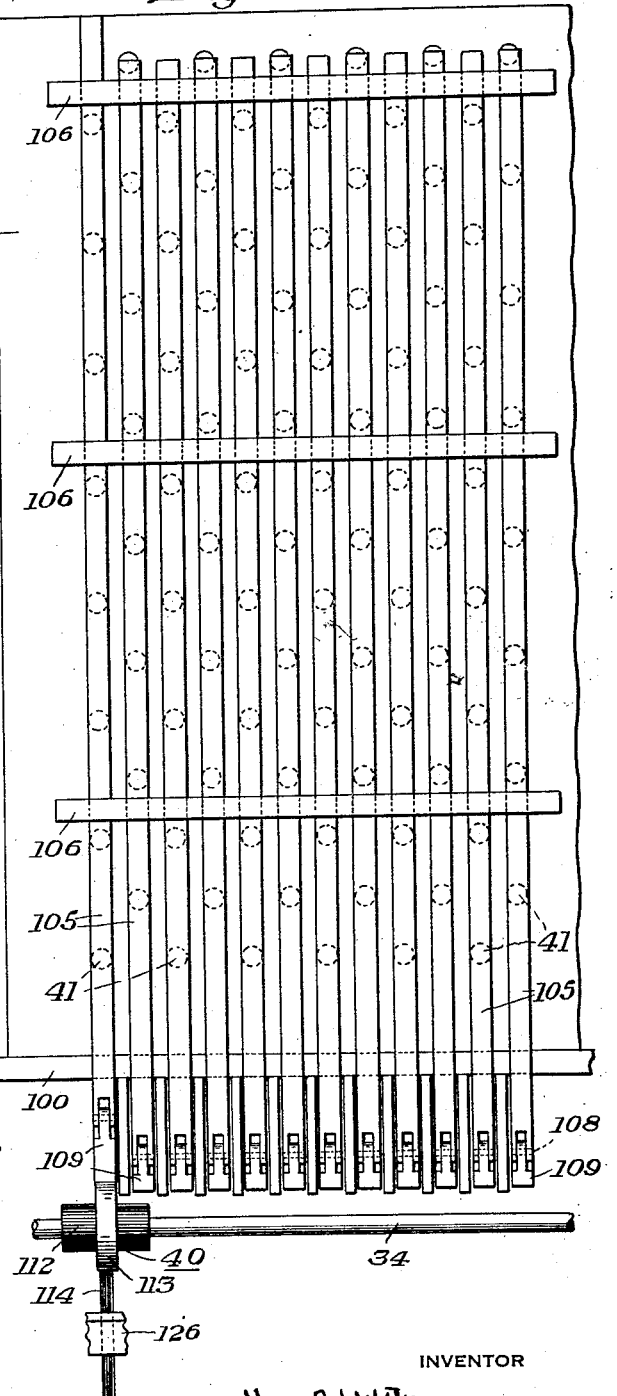
INVENTOR
Harry A. Webster,
by his attys,
Byrnes, Stebbins, Parmelee & Blenko

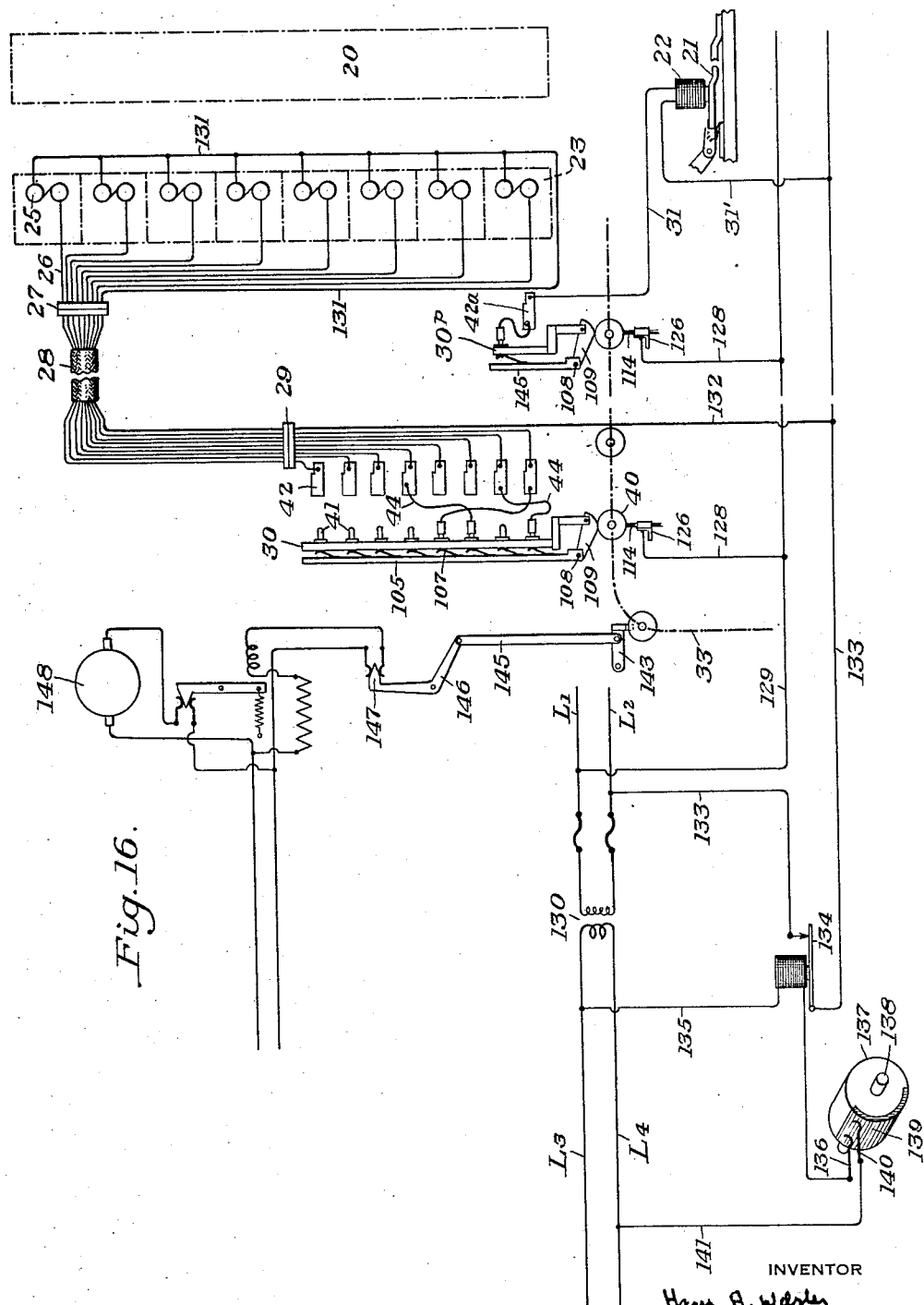

July 28, 1931.  H. A. WEBSTER  1,816,103
PRINTING OF FLOOR COVERINGS AND THE LIKE
Filed Aug. 26, 1929   25 Sheets-Sheet 13
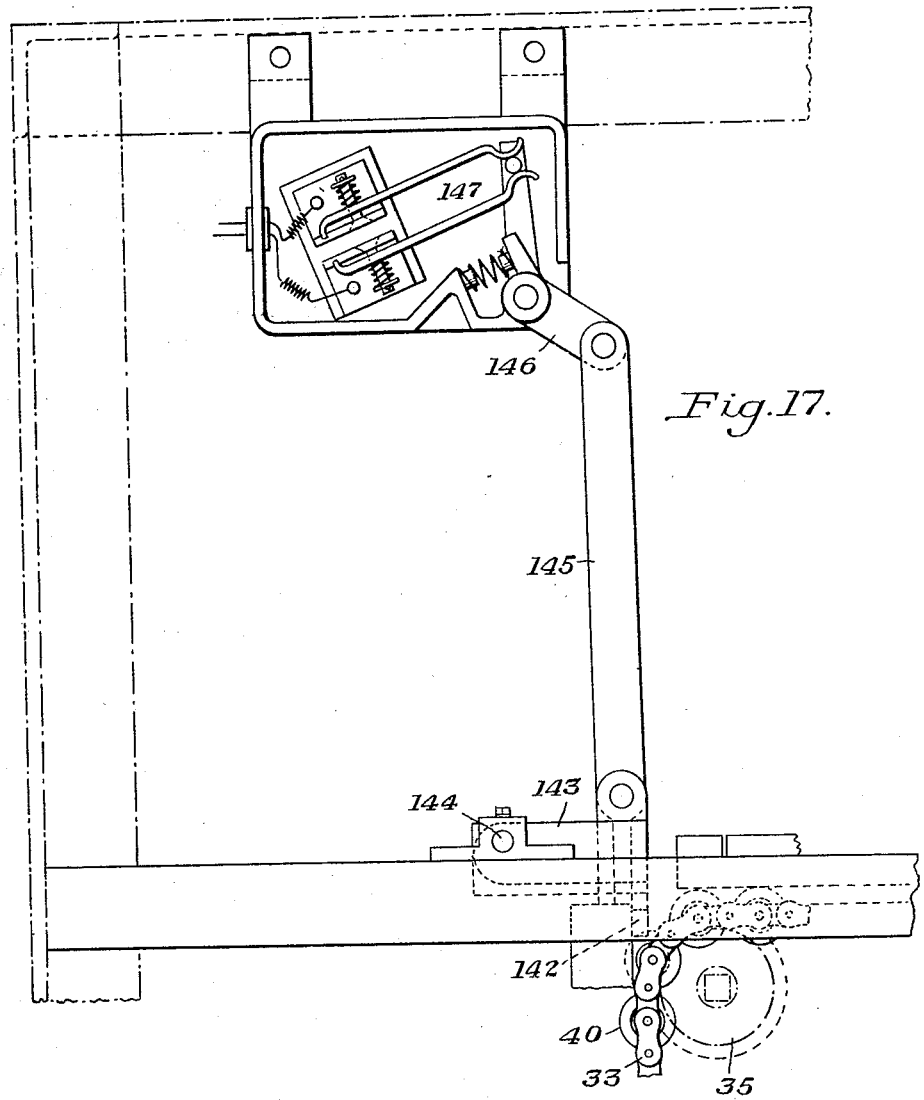
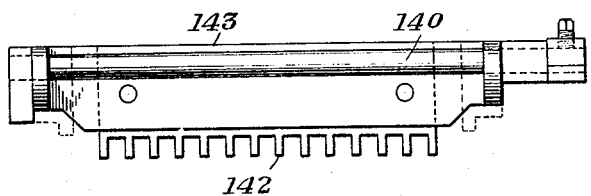
INVENTOR July 28, 1931.  H. A. WEBSTER  1,816,103
PRINTING OF FLOOR COVERINGS AND THE LIKE
Filed Aug. 26, 1929    25 Sheets-Sheet 14
Fig. 19.
Fig. 26.
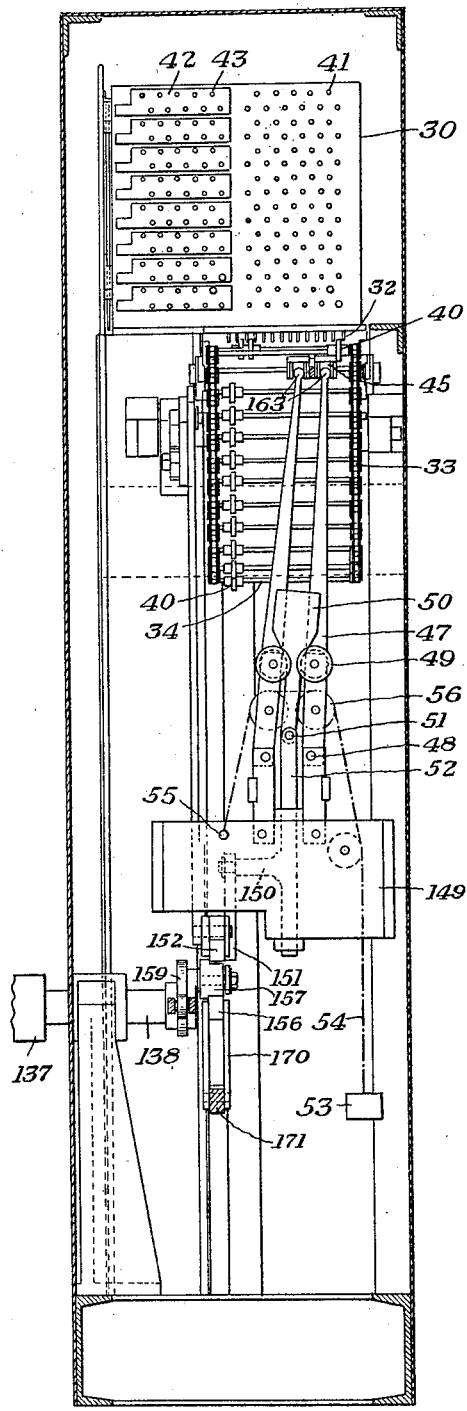
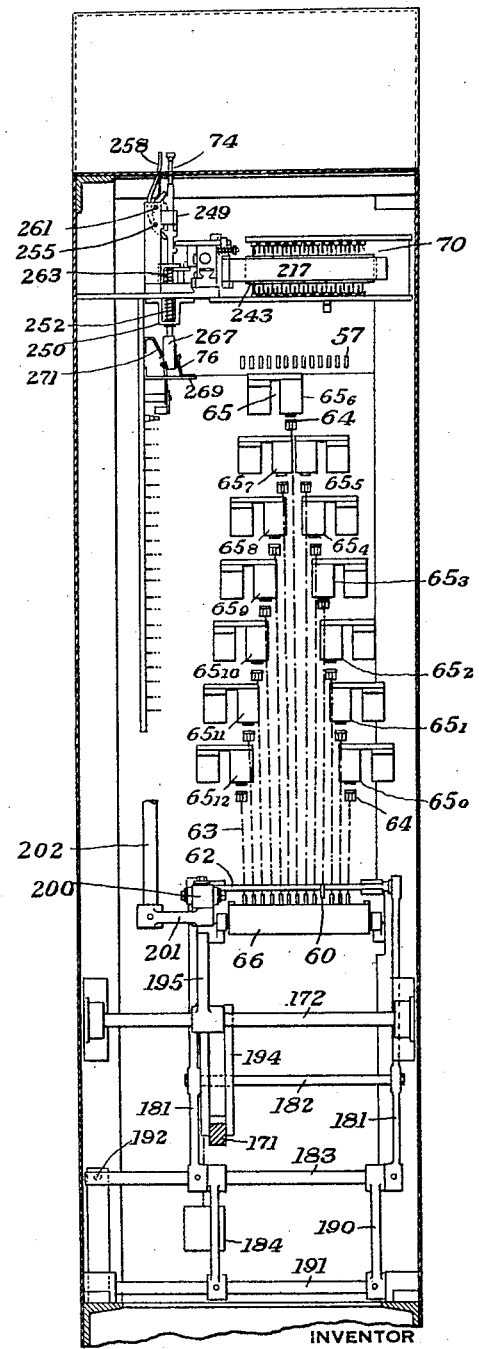
INVENTOR

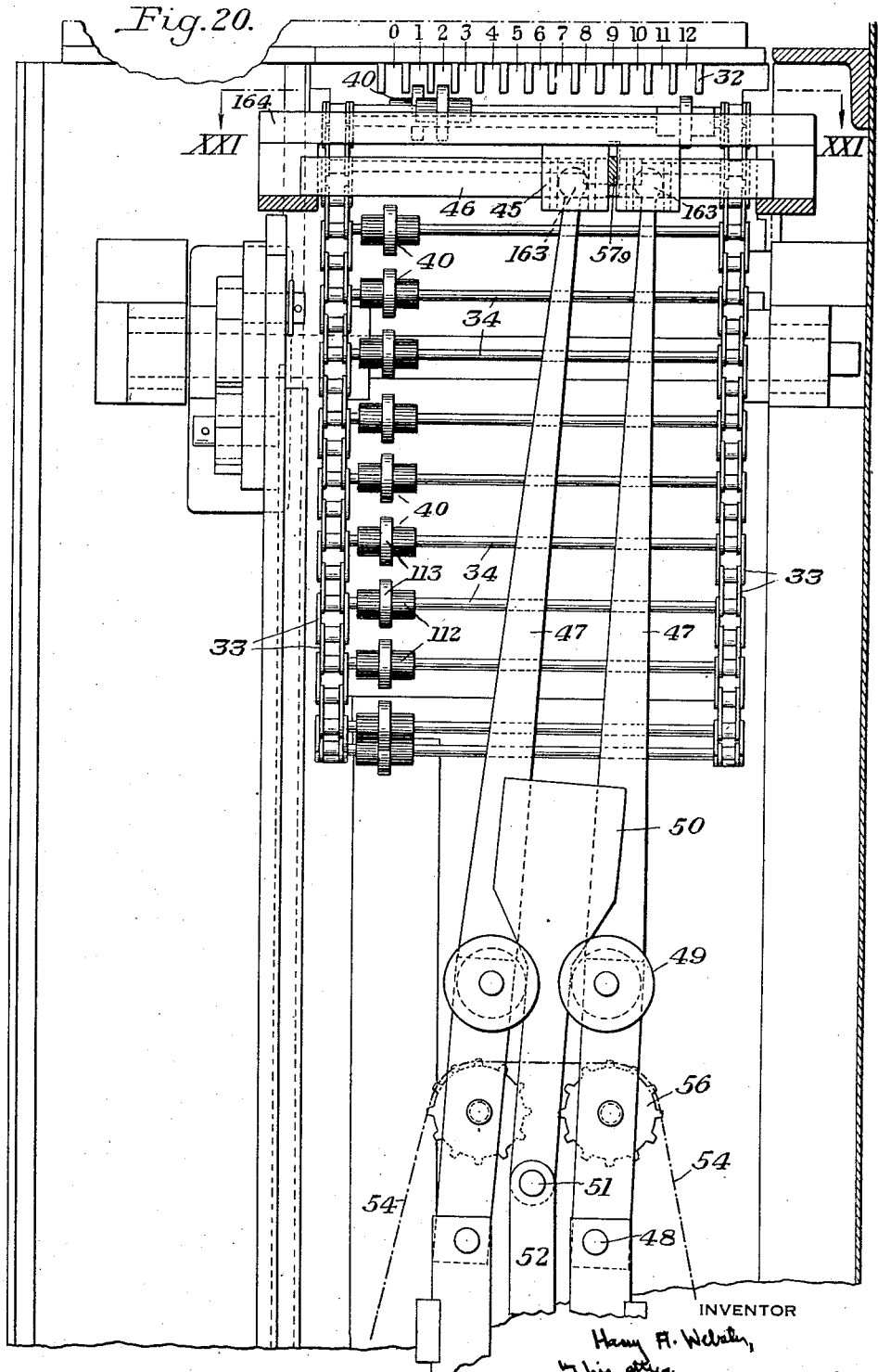

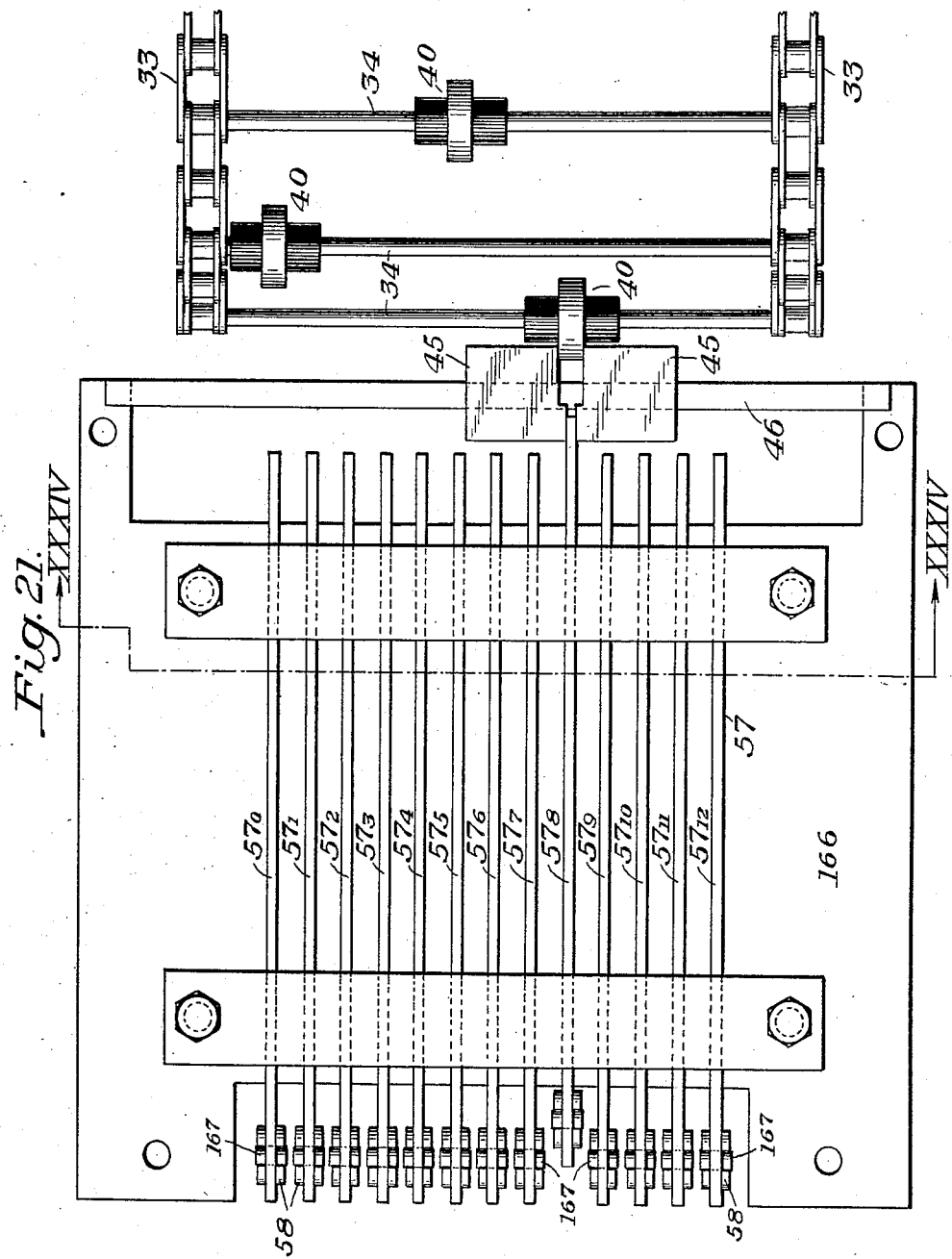

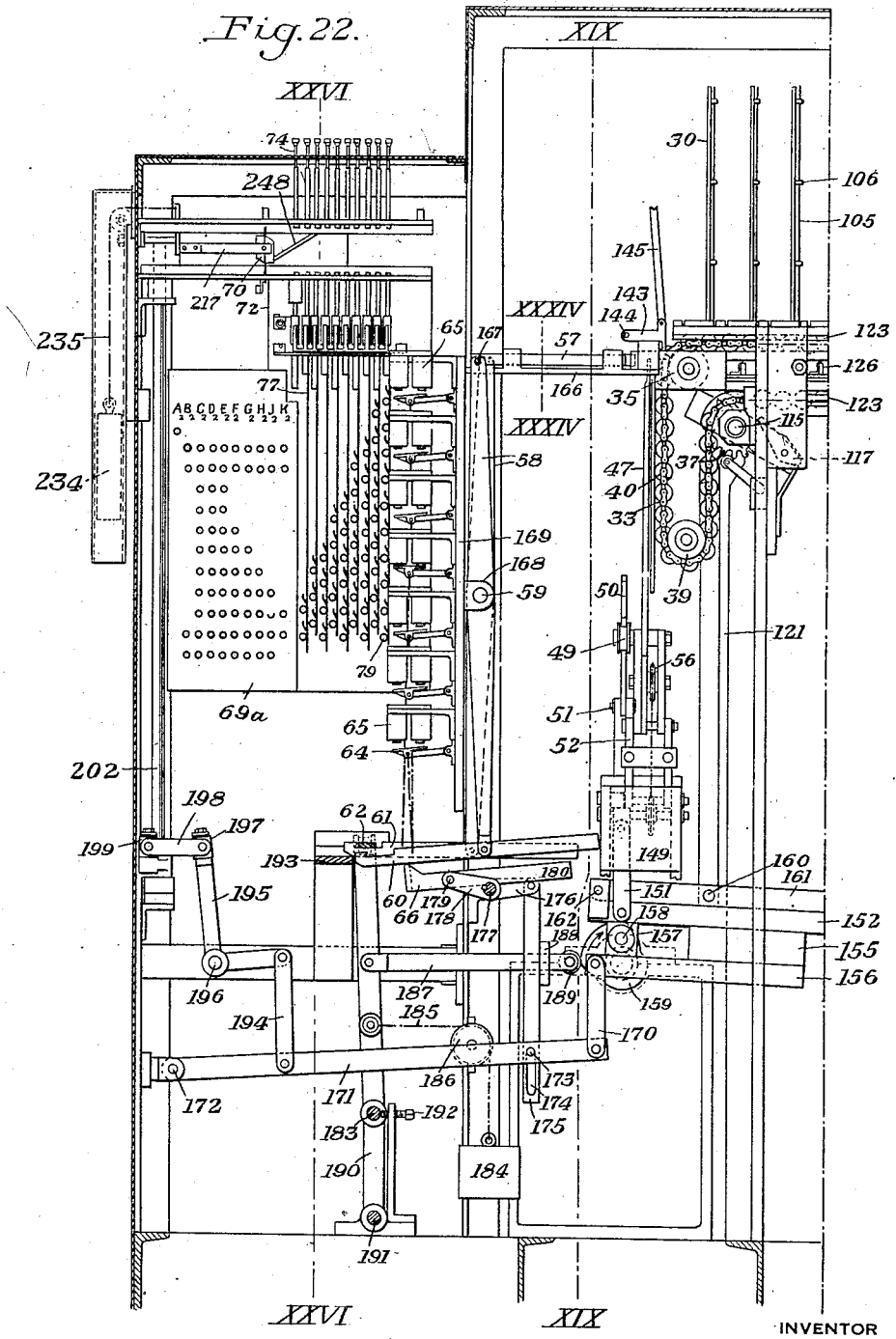

July 28, 1931.  H. A. WEBSTER  1,816,103
PRINTING OF FLOOR COVERINGS AND THE LIKE
Filed Aug. 26, 1929  25 Sheets-Sheet 18
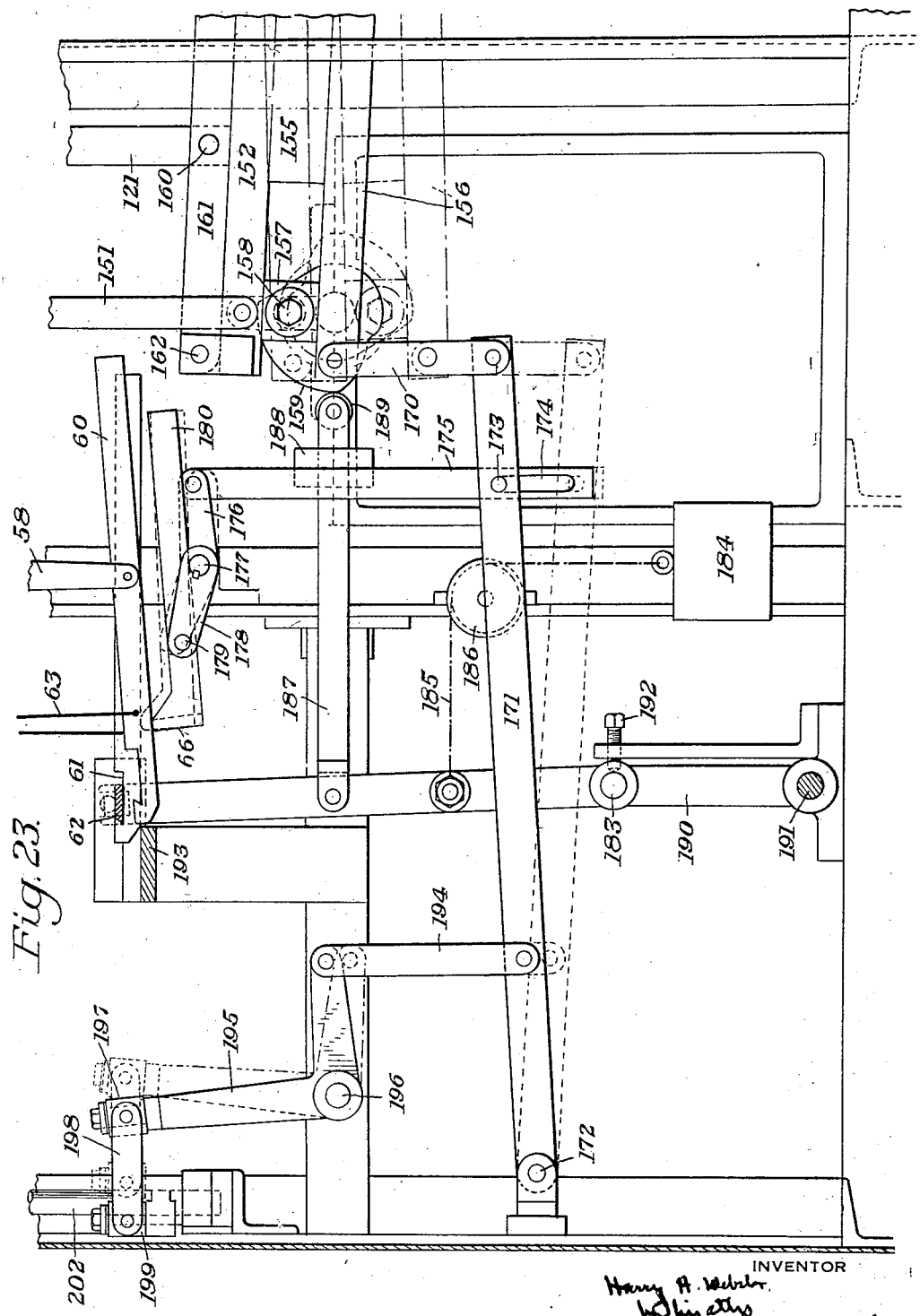

July 28, 1931.  H. A. WEBSTER  1,816,103
PRINTING OF FLOOR COVERINGS AND THE LIKE
Filed Aug. 26, 1929  25 Sheets-Sheet 19
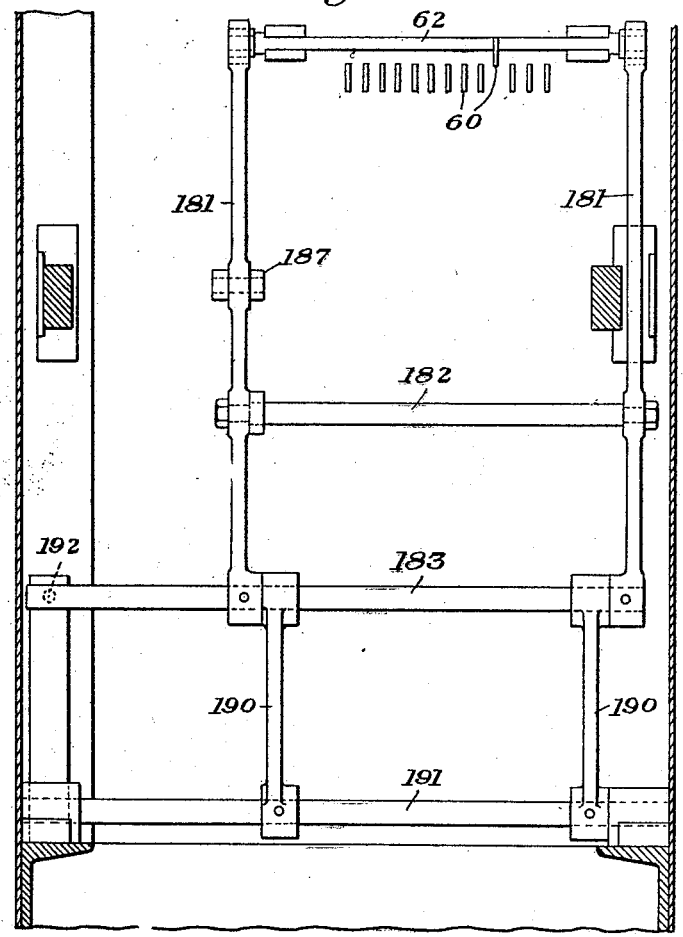
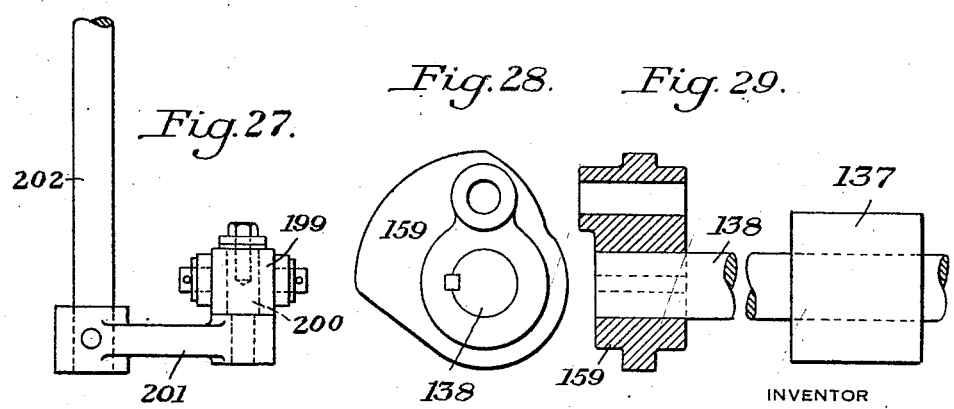

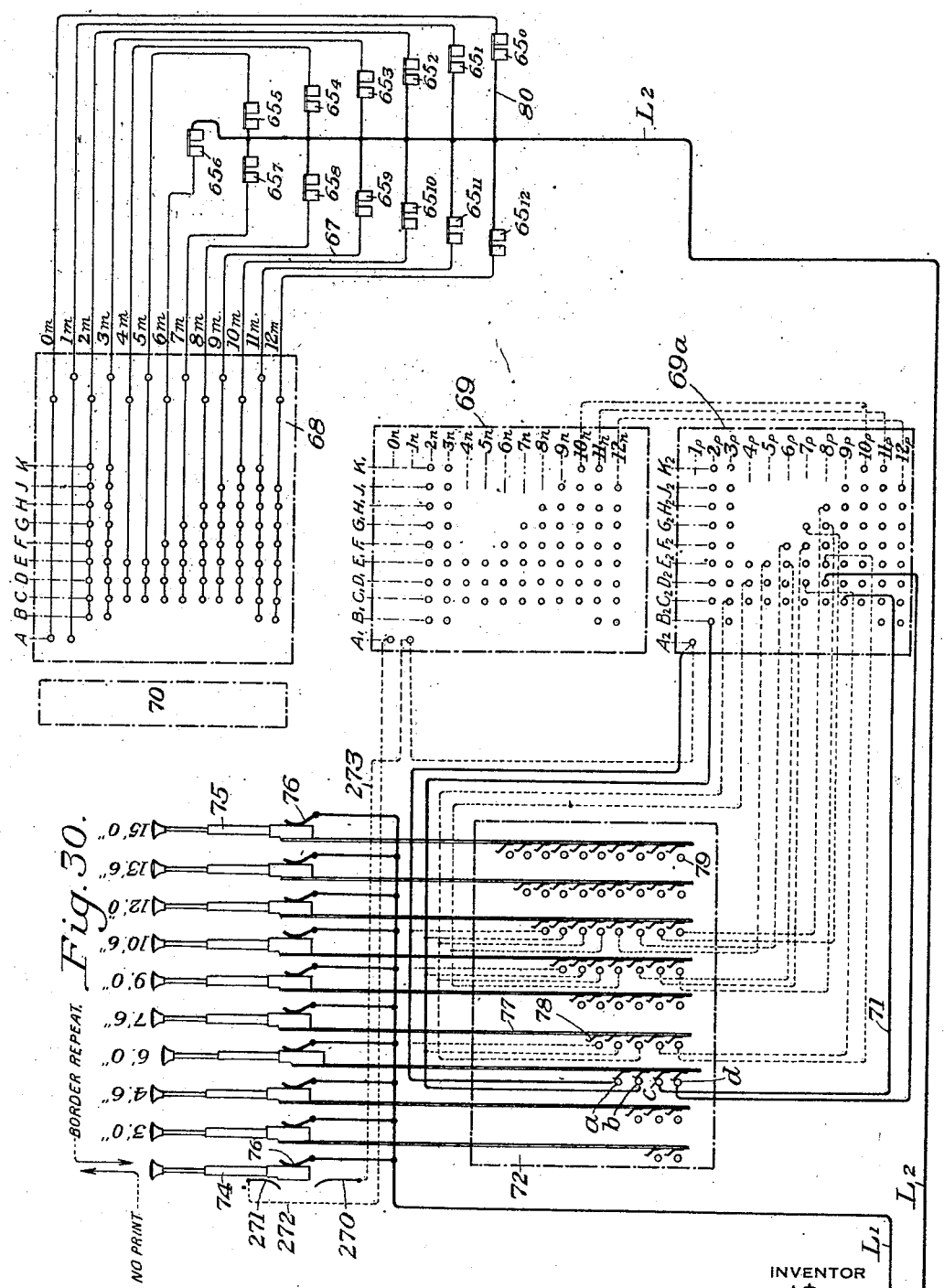

July 28, 1931.   H. A. WEBSTER   1,816,103
PRINTING OF FLOOR COVERINGS AND THE LIKE
Filed Aug. 26, 1929   25 Sheets-Sheet 21
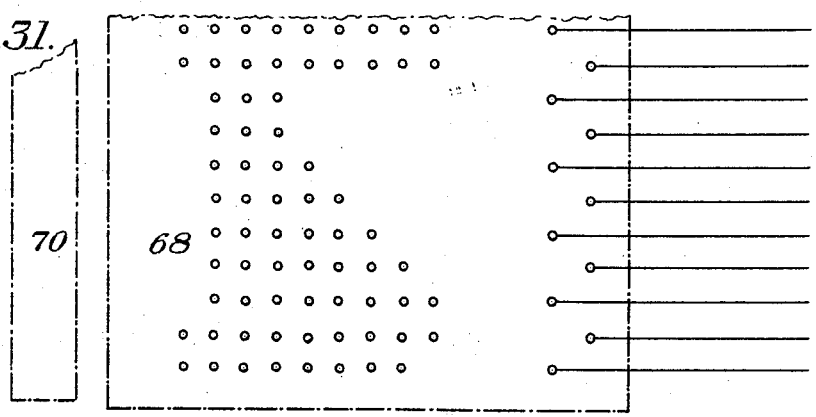
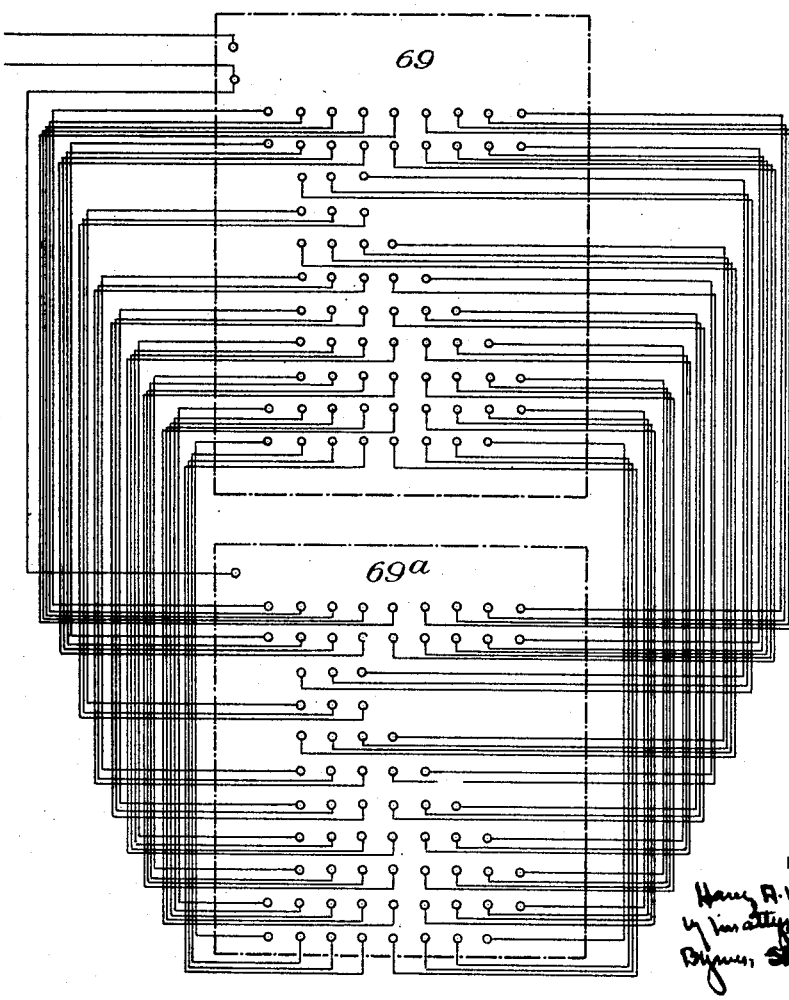
INVENTOR

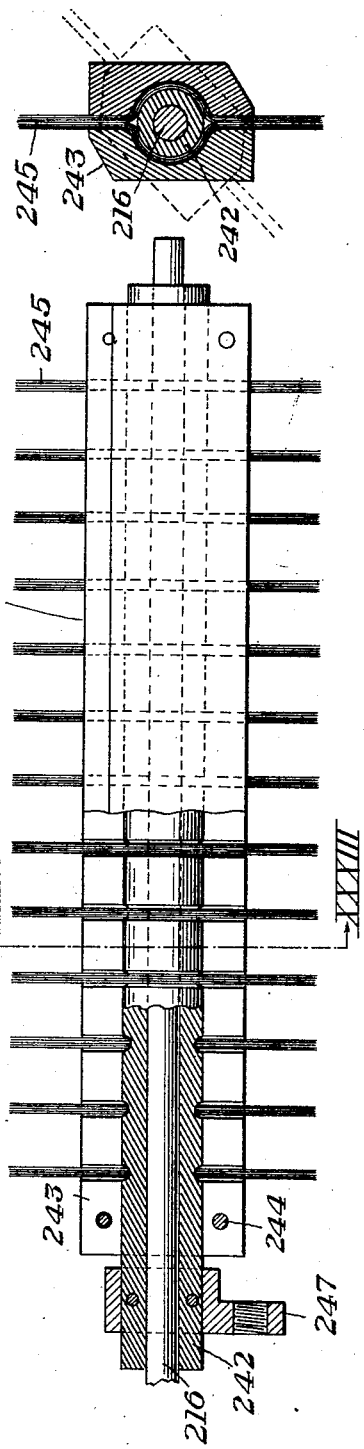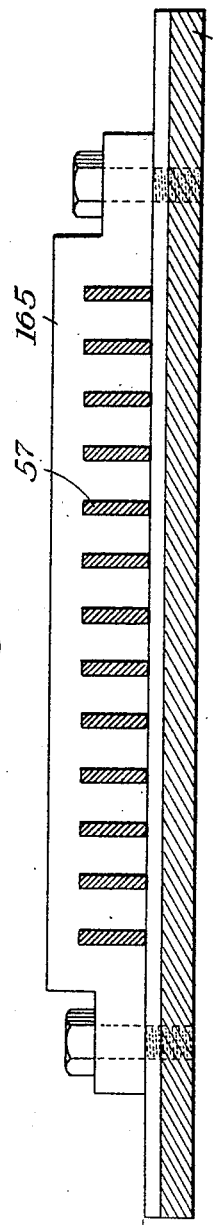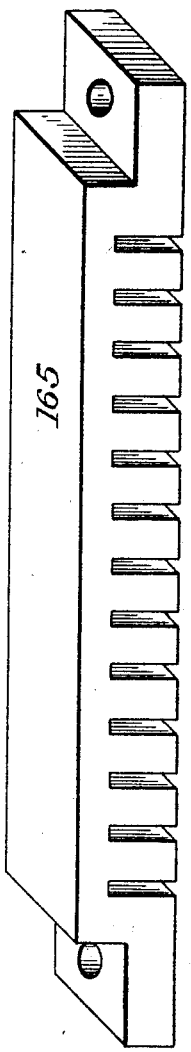

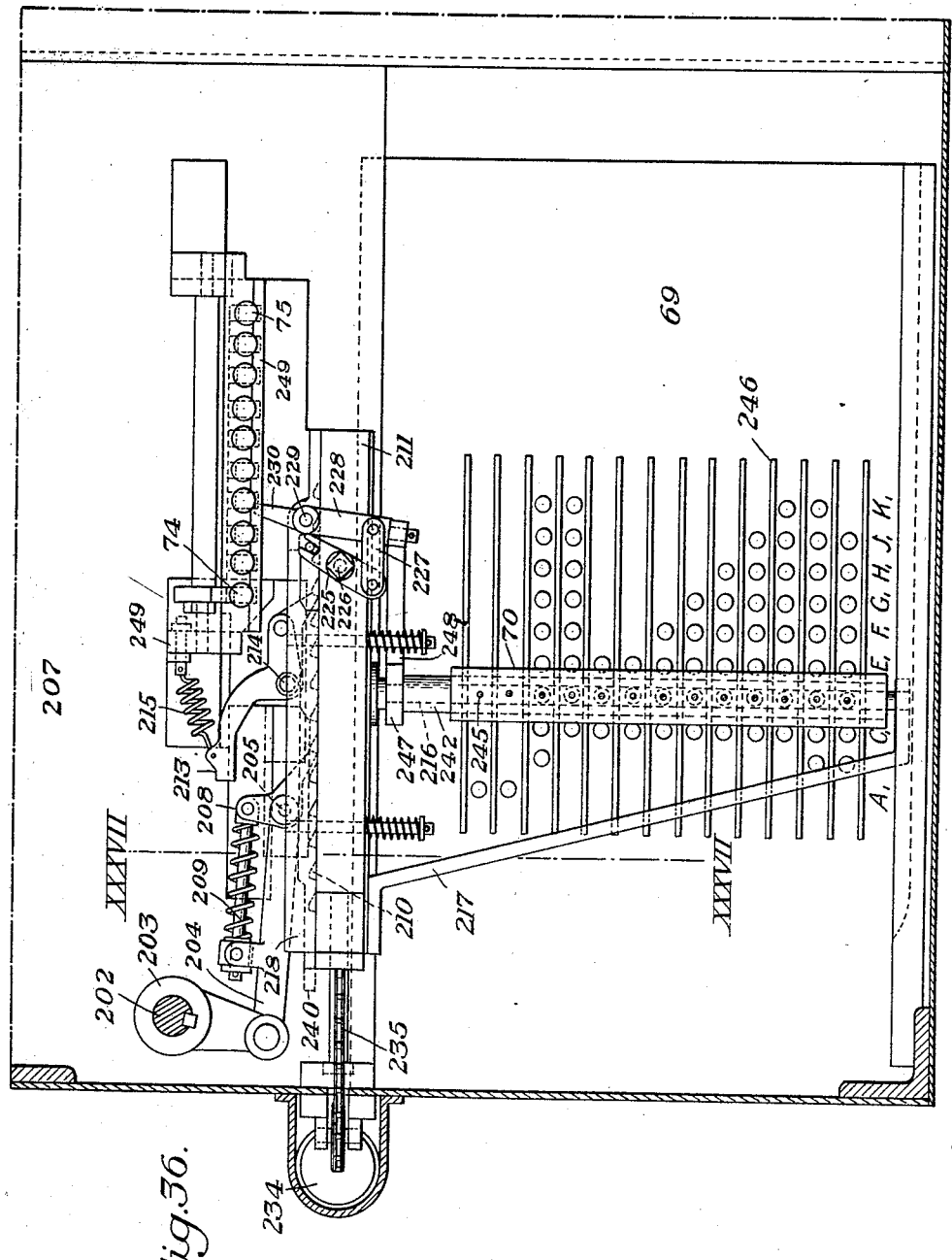

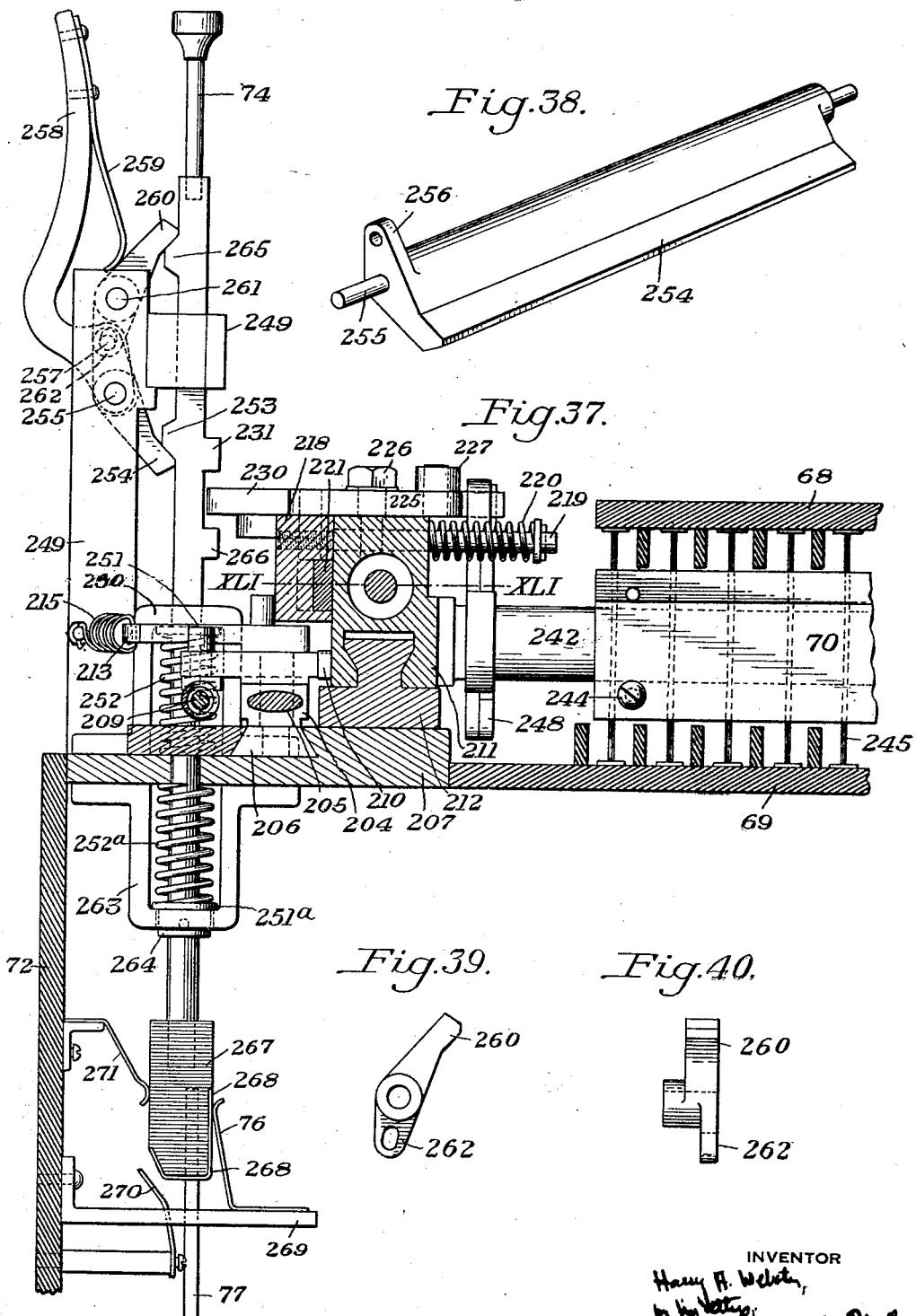

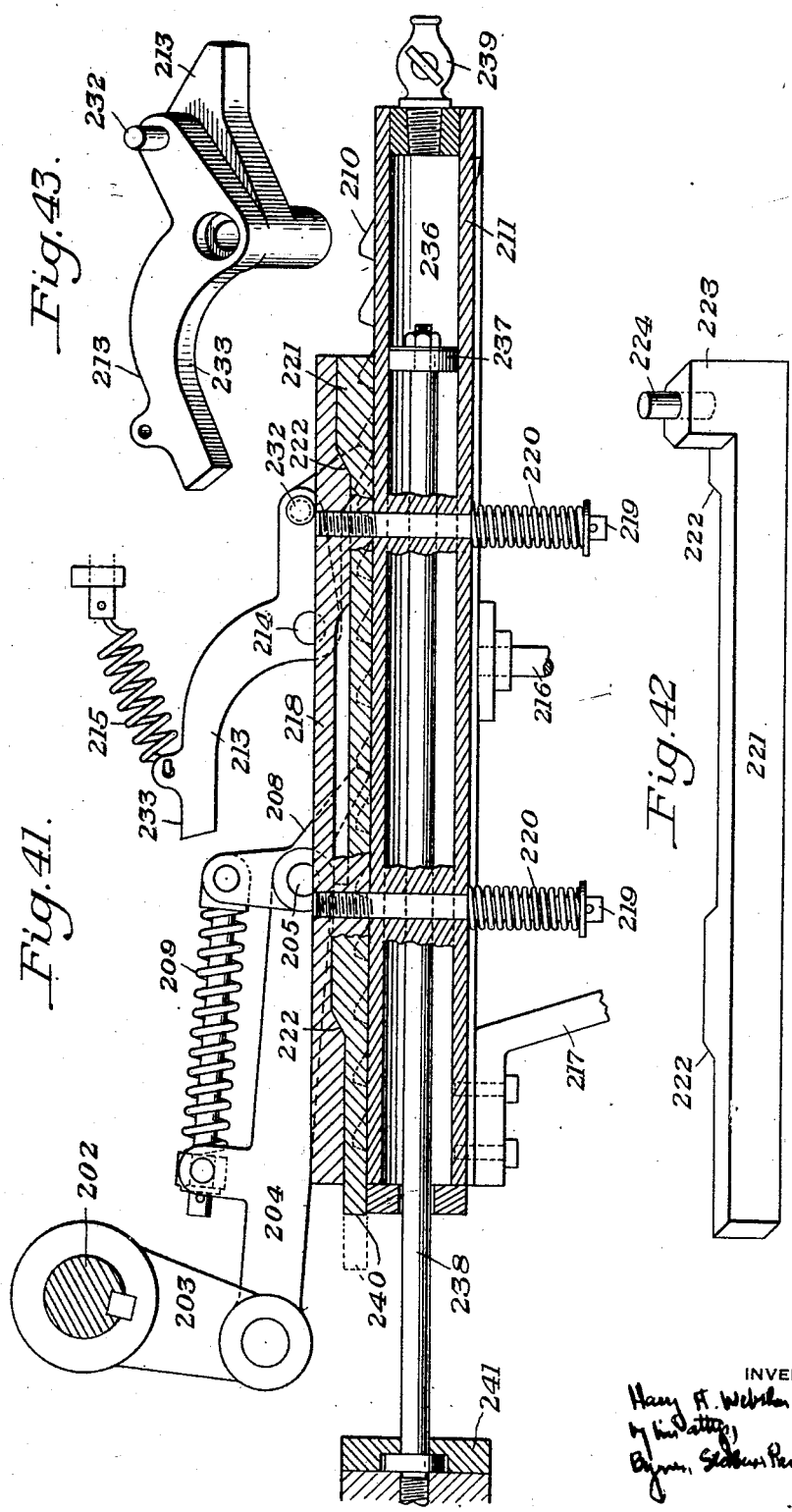

Patented July 28, 1931

1,816,103

UNITED STATES PATENT OFFICE

HARRY A. WEBSTER, OF LANCASTER, PENNSYLVANIA, ASSIGNOR TO ARMSTRONG CORK COMPANY, OF LANCASTER, PENNSYLVANIA, A CORPORATION OF PENNSYLVANIA

PRINTING OF FLOOR COVERINGS AND THE LIKE

Application filed August 26, 1929. Serial No. 388,584.

This invention relates to the printing of floor coverings and the like and provides means whereby a printing machine, such as the well known block printing machine in common use in the floor covering industry, may be so controlled as to vary the length of the pattern printed, and various recombinations of figures printable by the blocks may be effected. A machine for selectively controlling the operation of the printing blocks is termed in the industry a tripper. The present invention relates to an improved tripper which provides great flexibility in operation and which is particularly useful in connection with a printing machine having one or more heads employing independently operable printing blocks.

A well known type of tripper is shown in the prior patent to Jones and Webster No. 1,263,900, dated April 23, 1918. Certain mechanism hereinafter described is more particularly described and claimed in the copending application of Daniel S. Holt, Serial No. 221,449, filed Sept. 23, 1927, patent No. 1,753,265. A so-called "sectional" printing head of the type which may be used with the present invention is more particularly described and claimed in my Patent No. 1,756,268, dated April 29, 1930.

In the printing of floor coverings it is desirable to print a series of rugs of different lengths and to change rapidly from one length to another. This is desirable not only because of the convenience in operation, but also because defects in the base material are frequently encountered and in order to avoid waste of material the rug to be printed on the material adjacent the defective portion must be changed in length so as to utilize as much good material as possible. When the end of a web is reached, the length of the rug frequently has to be changed to avoid waste.

The heads of a block printing machine of the ordinary type are provided with latches whereby a head may be "latched up" and thus restrained from printing if desired. These machines consist of a bed over which the web of material to be printed is moved in a step by step manner and spaced printing heads which are elevated by cams and are permitted by such cams to lower at intervals. When it is desired that a head shall not print it is latched up and thus prevented from lowering to printing position. The Jones and Webster patent above referred to shows a rug tripper which is effective for latching up desired heads so as to selectively print a field and side border portions or cross border portions on the web as desired. However, with the introduction of the sectional head, such as described in my patent above referred to, it is necessary to provide other means for controlling the operation. In most cases a few sectional heads will be used with a number of heads of the usual type and it is therefore necessary to provide for latching up the solid heads and for effecting individual control of the several printing blocks on the sectional heads. Such a control is provided by my improved tripper which is the subject matter of the present application.

With such control it is possible to obtain many new effects. Certain designs obtainable by a section on one printing head can be impressed on the same section of the web as another design printed by a section on another head. In this manner a wider variety in rug lengths and rug effects can be obtained with the same set of printing blocks. The blocks may be operated in a desired sequence containing a certain number of printing steps to print one rug design, and the number of steps may be varied as desired. In this manner the space relation between certain impressions may be varied.

Certain features of construction, hereinafter described, but forming a part of the Holt invention, are utilized in my improved tripper. In the Holt invention a pair of chains spaced apart by parallel rods are passed over sprockets so that the chains extend substantially parallel to certain "alleys" wherein there are disposed contact points forming part of a head control circuit. Spools slidably mounted on the rods are shifted therealong so as to travel in the alleys and thus actuate different contacts in a desired sequence. According to the Holt invention, a master controller is employed, this master controller determining one arrangement of spools which is repeated so long as the machine is in operation. It will be obvious that what might be termed the "spool pattern" determines the operation of the printing machine. I provide a controller wherein a large number of spool patterns are predetermined and any one of these may be imposed on the controller as desired. In addition to this, I provide control panels having sets of contacts arranged thereon, an entire set of contacts being energized by a spool. Means is provided for connecting the various contacts or terminals to magnets controlling the individual printing blocks on the sectional heads and to magnets controlling the latching of the solid heads.

The several predetermined spool patterns which are selectively imposed on the controller are selected at the will of the operator by the mere depression of a key. I provide a series of keys corresponding to different rug lengths, and the pressing of a key establishes a number of contacts through which circuits may be made. These circuits are successively energized by means of a travelling brush which takes a number of steps, the number depending on which key is depressed, and then repeats the operation.

In the accompanying drawings illustrating the present preferred embodiment of the invention, Figures 1 to 4 inclusive are views showing, by way of example, rugs of different length produced from the same printing blocks;

Figure 7 is a side elevation of a part of the printing machine, showing a sectional head;

Figure 8 is a detail view showing a part of the chains which carry the spools, and further showing certain of the control panels and part of the spool shifting mechanism;

Figure 9 is a side elevation of an extension of the chain and panel mechanism shown in Figure 8;

Figure 10 is a view through the tripper to reduced scale viewed in the direction of the arrows X—X in Figure 9;

Figure 11 is a horizontal section taken on the line XI—XI of Figure 10;

Figure 12 is a view corresponding to Figure 9 but to reduced scale and showing additional mechanism;

Figure 13 is a side elevation of two of the control panels;

Figure 14 is a rear view, partly broken away, of one of the control panels;

Figure 16 is a wiring diagram showing the connections between the control panels, the magnets for the sectional heads and the latching up magnet for a solid head;

Figure 17 is a view of a safety device with the cover removed;

Figure 18 is a rear view of a comb forming a part of the safety device of Figure 17;

Figure 19 is a vertical section through the tripper showing the spool shifting mechanism and taken on the line XIX—XIX of Figure 22;

Figure 20 is a view to enlarged scale of a portion of said shifting mechanism;

Figure 21 is a horizontal vew to enlarged scale taken on the line XXI—XXI of Figure 20.

Figure 22 is a vertical longitudinal section through the tripper showing the spool shifting mechanism and the controls therefor;

Figure 23 is a view to enlarged scale of the bottom portion of the mechanism shown in Figure 22;

Figure 25 is a vertical section taken on the line XXV—XXV of Figure 24;

Figure 26 is a vertical transverse section taken on the line XXVI—XXVI of Figure 22;

Figure 27 is a detail view of a connection employed in the driving of the contacting brush;

Figure 28 is a detail view of a crank and cam used for actuating the spool shifting mechanism;

Figure 29 is a section therethrough and showing the driving shaft therefor;

Figure 30 is a wiring diagram of the tripper;

Figure 31 is a wiring diagram of certain of the panels employed in the tripper;

Figure 32 is a side elevation, partly broken away, of the brush employed for effecting the sectional closing of the control circuits;

Figure 33 is a section therethrough, taken on the line XXXIII—XXXIII of Figure 32;

Figure 34 is a section taken on the line XXXIV—XXXIV of Figure 21;

Figure 35 is a perspective view of a part of the apparatus shown in Figure 34;

Figure 36 is a top plan view, partly broken away, of the controlling keys and associated mechanism;

Figure 37 is a vertical section to enlarged scale taken on the line XXXVII—XXXVII of Figure 36;

Figure 38 is a perspective view of a release employed in connection with the keys;

Figure 39 is a plan view of a pawl forming a part of the mechanism associated with the keys;

Figure 40 is a side elevation thereof;

Figure 41 is a longitudinal section taken on the line XLI—XLI of Figure 37;

Figure 42 is a perspective view of a cam shown in Figure 41; and

Figure 43 is a perspective of the pawl shown in Figure 41.

Figure 1:
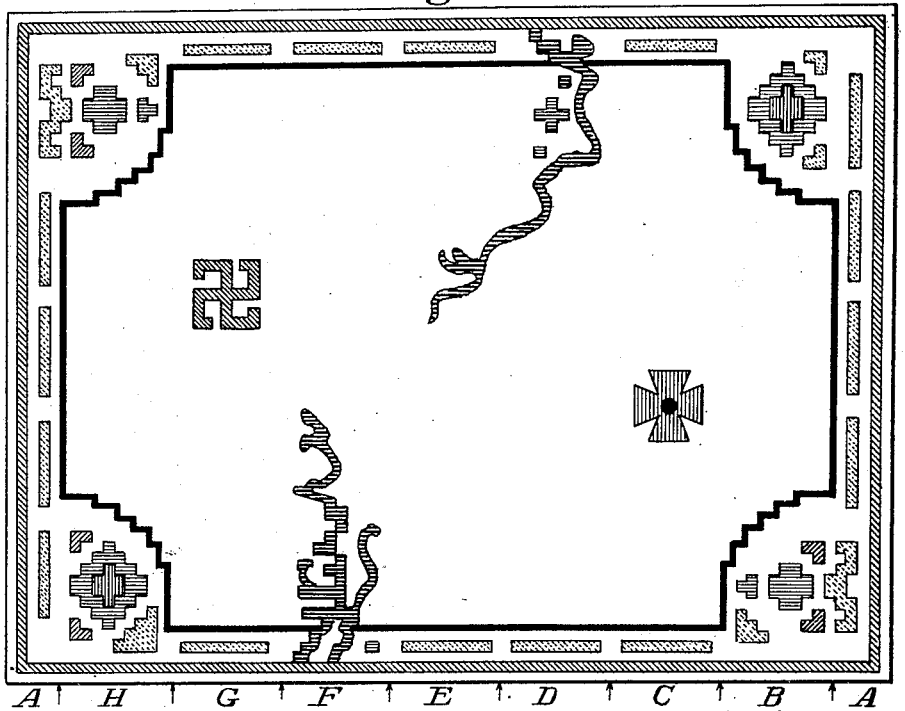

The construction and operation of the tripper shown in the drawings will now be described in general.

Figure 2:
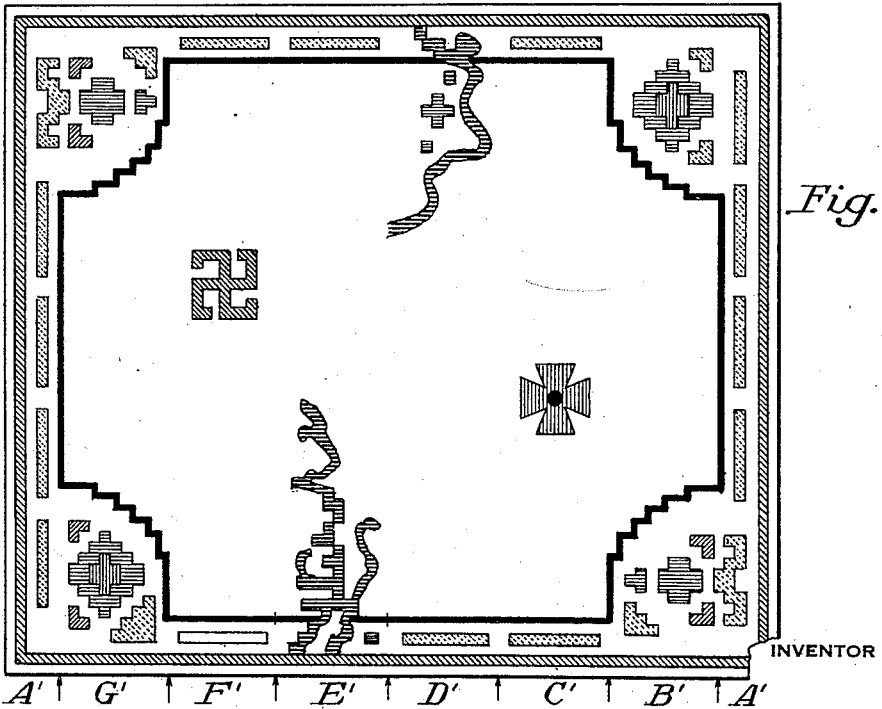
Figure 3:
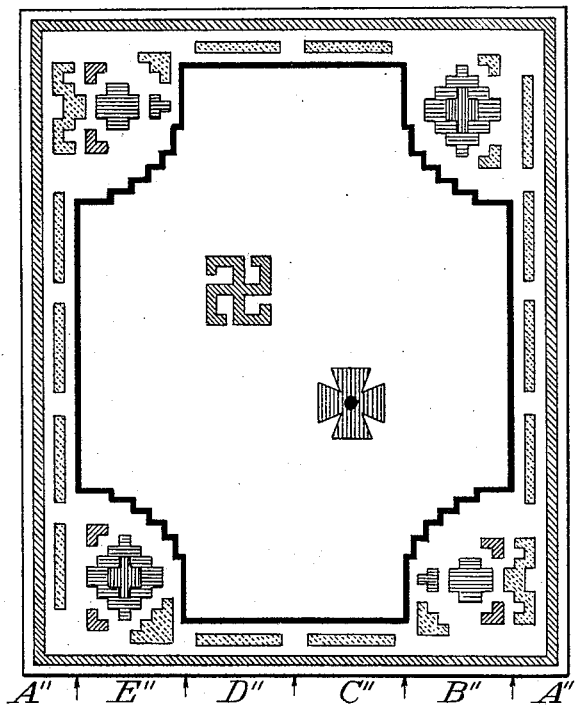
Figure 4:
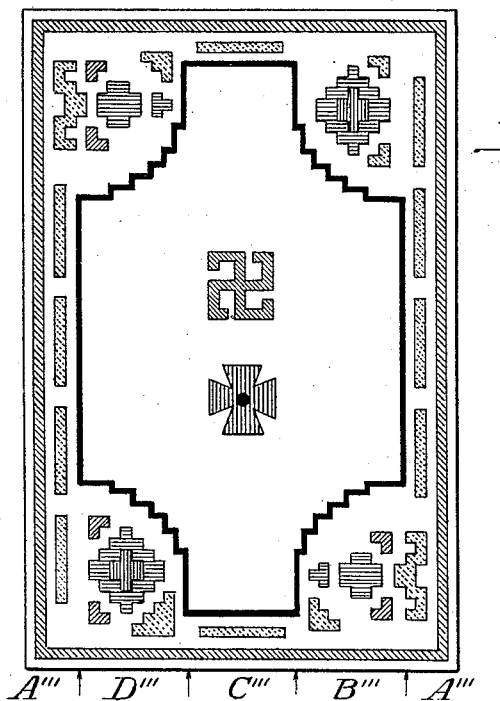
Figure 6:
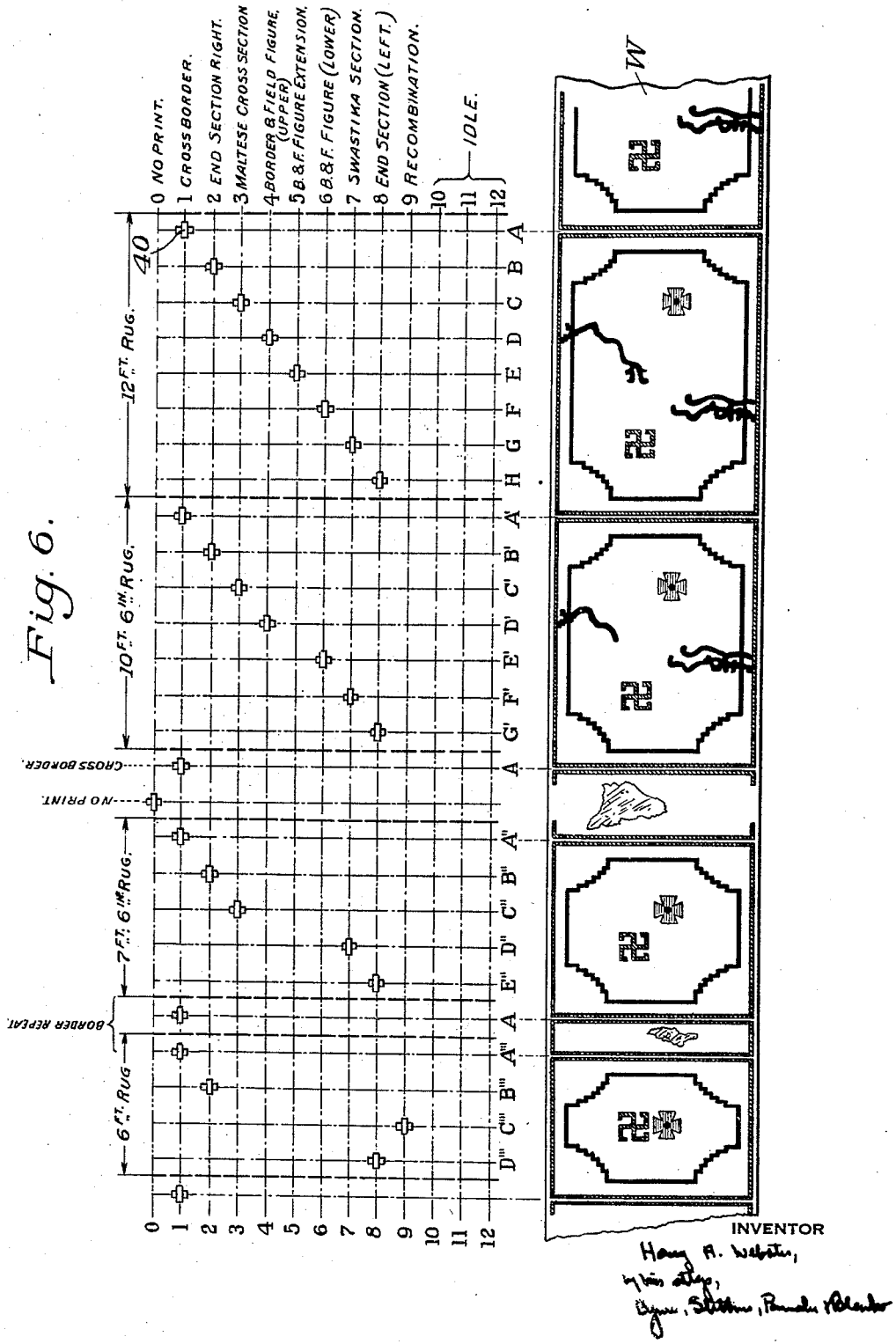
Figure 6 is a diagram showing different spool patterns and corresponding rugs produced thereby.
Figure 24:
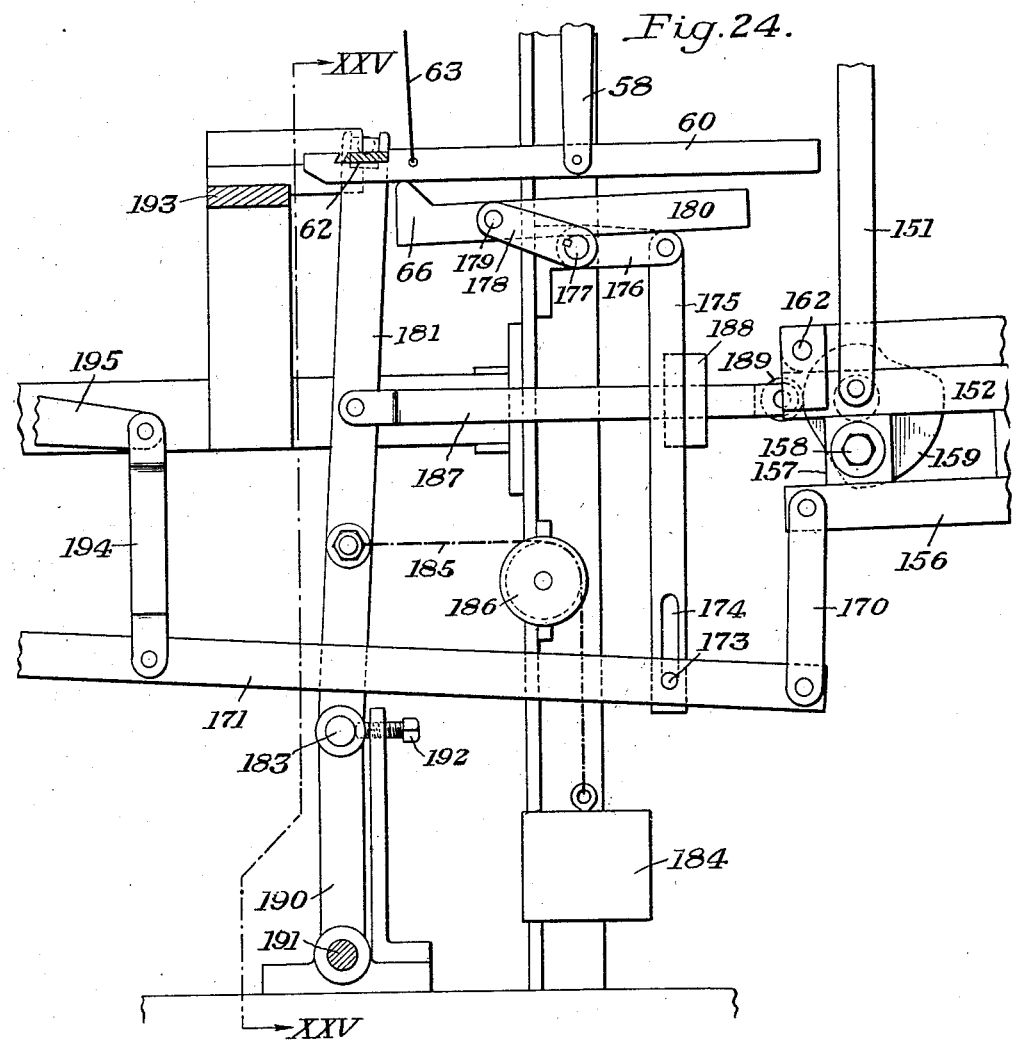
Figure 24 is a view to still further enlarged scale and showing a portion of the mechanism of Figure 23.
Figure 15:
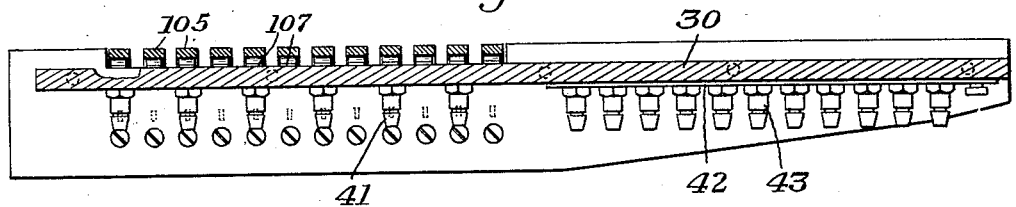
Figure 15 is a section taken on the line XV—XV of Figure 13.

Referring to Figures 1 to 4 inclusive and the bottom portion of Figure 6, the rugs therein show by way of example a series of patterns which it is desired to selectively print. Each rug has cross border portions A and a body which may be divided up into sections of uniform width. It is customary in the floor covering art to print rugs in 18 inch sections and with the rugs shown in the example the cross borders at the right and left hand ends will be printed by the same block. The rug shown in Figure 1 comprises sections A, B, C, D, E, F, G and H and is therefore 12 feet long. The rug shown in Figure 2 is made up of sections A', B', C', D', E', F', G', and is therefore 10 feet 6 inches long. The rug shown in Figure 3 is made up of sections A'', B'', C'', D'' and E'' and is therefore 7 feet 6 inches long; while the rug shown in Figure 4 is made up of sections A''', B''', C''', and D''' and is 6 feet long. The sections C, C' and C'' in the rugs of Figures 1, 2 and 3 contain a Maltese cross, while the sections B, F' and D'' in the same rugs contain a swastika. These two design elements have been combined into the same section in Figure 4, the section C''' thereof containing both these designs in the recombination. It will be understood that rugs of other lengths in the same series may be printed, the four designs given being merely for purposes of illustration.

The lower part of Figure 6 shows the four rugs of Figures 1 to 4 inclusive, and in addition shows between the 10 ft. 6 in. rug of Figure 2 and the 7 ft. 6 in. rug of Figure 3 a strip of unprinted material, the printing being omitted because of a defect in the material. Between the 7 ft. 6 in. rug and the 6 ft. rug there is shown a repeated printing of the cross border head or heads for the purpose of taking care of a relatively small defect.

The rugs shown in Figures 1 to 4 are printed with some solid heads and some sectional heads and it is necessary to selectively control the several printing blocks to do this.

*General description of the machine*

Figure 5:
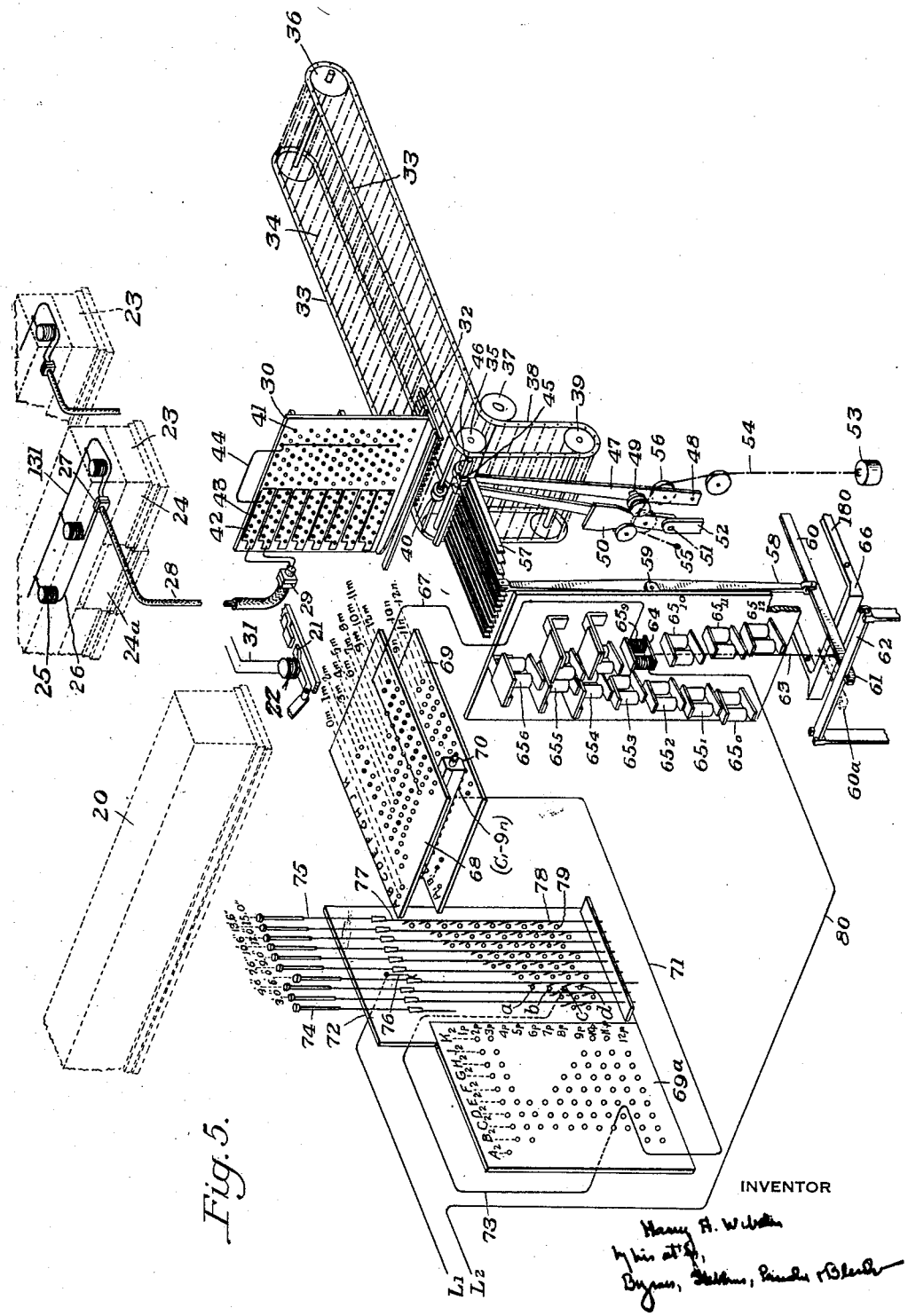
Figure 5 is a perspective diagram showing the several elements of the machine.

See particularly Figures 5 and 6.

Figure 5 shows a solid head 20 of the usual type and adapted to be latched up by a latch 21 controlled by a magnet 22. Sectional heads 23 are also shown, these having a number of individually controllable printing blocks 24 movable into or out of printing position, such movement being controlled by magnets 25. There is a magnet for each section. The heads are of the type illustrated and described in my patent above referred to. The sectional heads reciprocate constantly, the blocks being movable relative to the heads. If a magnet of a particular block is not energized, the block will remain in an upper position and will not print; but if the magnet is energized, the block will be moved to a lowered position, as shown at 24a in Figure 5, and in this position will print.

The magnets for each sectional head are connected through wires 26 and 131 to a terminal 27 on the head. A flexible cable 28 connects the several wires to any one of a number of terminals 29 associated with control panels 30. In the machine as constructed there is a control panel 30 for each head, but only one panel is shown in Figure 5 for the sake of clearness. Where a solid head is employed, wires 31 lead from the magnet 22 to a corresponding panel.

The several panels 30, when in operating position, lie adjacent and transversely of a series of bars 32 of insulating material, providing paths or alleys therebetween. Beneath the strips 32 there are arranged two parallel chains 33 connected at regular intervals by cross rods 34. The chains extend from sprockets 35 to sprockets 36, thence back to sprockets 37, thence downwardly in a loop 38 (the loop being maintained by the weight of cradled sprockets 39), thence upwardly to the sprockets 35. The chains 33 are advanced in a step-by-step manner and in an amount corresponding to one-half the spacing between control panels 30. One step of movement is effected for each printing step of the printing machine to be controlled the tripper being connected to the printing machine so as to insure proper timing.

Each rod 34 carries a spool 40 which is slidably mounted on the rod so that it may be shifted from side to side. Each spool has a rim insulated from its rod 34.

The control panels 30 are provided with sets of terminals 41 arranged in vertical rows, there being a row for each alley. A switch bar, not shown in Figure 5 but hereinafter described, is arranged behind each row of terminals and is so mounted that when a spool 40 passes through a particular alley the switch bar is lifted, thus making a contact with all of the terminals in that particular set. At one side of the panel there is a series of terminal plates 42 having terminal posts 43 thereon and flexible connectors 44 are used to connect the posts 43 with any desired terminals in the sets. The plates 42 are in turn connected to the terminal 29. In this manner the several magnets in a sectional head may be connected to any desired terminal or terminals on its control panel 30 so that the movement of a spool 40 through any particular alley will energize that magnet and cause actuation of the corresponding printing blocks.

The spools 40 are shifted sidewise by means of slides 45 mounted on a cross bar 46. The slides 45 are connected to the arms 47 of a "scissors" mechanism. Each arm is pivoted at 48 and carries a roller 49 engaged by a wedge cam 50. The wedge cam 50 is pivotally connected at 51 to a reciprocating bar 52. On each actuation of the machine, the wedge cam 50 is moved downwardly, thereby separating the scissors arms 47 and moving the slides 45 apart. When the wedge cam moves upwardly, the scissors arms 47 are brought together by means of a counterweight 53 connected to a chain 54. The chain is dead-ended at 55 and runs over sprockets 56 on each scissors arm.

It will be seen that with this mechanism the slides 45 will tend to move together but that if a stop is interposed between them at any point within their range of travel the slide 45 which first reaches the stop will be checked in its movement and the other slide will continue to move until the stop is reached. The mechanism is so timed that the slides 45 are separated to the fullest extent just prior to a stepping forward of the chains 33. This forward movement brings a spool 40 between the slides 45 so that when the wedge cam 50 is again raised, the spool will be shifted laterally.

A series of stops 57 is provided, these stops being in the form of slide bars and there being one slide bar for each alley. The several slide bars 57 are connected to vertically extending levers 58 pivotally mounted at 59 and connected at their bottom ends to control arms 60. The control arms 60 are notched, as indicated at 61, to receive a reciprocating cross bar 62, but normally lie below such arm as indicated at 60a. Each control arm 60 is, however, connected through a rigid wire 63 to the armature 64 of a control magnet 65. There is a control magnet 65 for each control bar 60.

A lifting bar 66 extends beneath the several control arms 60 and during each cycle of operation raises all of the control arms so as to bring their notches 61 into engagement with the actuating bar 62. Since the wires 63 are rigid the armatures 64 are lifted. The bar 66 is then lowered and if at that time any magnet 65 is energized, the corresponding control arm 60 will remain in its upper position, whereupon movement of the cross bar 62 will cause the corresponding slide 57 to move inwardly and form a stop for the slides 45. The lifting of the armature 64 by the lifting bar 66 permits of using relatively small magnets and makes the operation more positive.

From the foregoing it will be seen that any desired spool pattern may be set up (as, for example, the spool patterns of Figure 6) by energizing the several magnets 65 in a desired sequence. For the printing of any given length of rug, the machine automatically sets up the desired spool pattern repeatedly and the change from one rug length to another can be made by simply pressing a proper key.

There are fourteen strips 32 forming 13 alleys therebetween. These alleys are numbered 0 to 12 inclusive (because of space limitations the alleys are not numbered in Figure 5—see Figure 20). 0 alley is a dead alley, there being no row of contacts 41 corresponding thereto. Therefore, if a spool is directed into 0 alley, no printing will result. The other alleys all have sets of contacts 41, and directing a spool down one of such alleys is effective for causing operation of the printing heads in a manner dependent upon the connections 44.

The stop bars 57 have been given corresponding subscripts $57_0$ to $57_{12}$ inclusive (see Figure 21), and these are operatively connected through their respective levers 58 and actuating bars 60 to the armatures of the several magnets 65 which have been given corresponding subscripts $65_0$ to $65_{12}$.

Each magnet 65 is connected through a wire 67 to one of 13 rows of contacts $0_m$ to $12_m$ inclusive on a panel 68. The several rows of contacts $0_m$ to $12_m$ contain different numbers of contacts, arbitrarily disposed, as hereinafter more fully set forth. The contacts in the several rows are equally spaced, and while the contacts may be considered to lie in rows $0_m$ to $12_m$ extending longitudinally of the panel 68, the several contacts may also be considered to lie in rows A, B, C, D, E, F, G H, J and K extending crosswise of the panel 68.

In Figure 5 the connections are shown for the magnet $65_9$. The wire 67 leads from the magnet $65_9$ to the panel 68 and connects all of the contacts in the row $9_m$. There is a corresponding wire connecting each magnet with all of the contacts in the corresponding row on the panel 68.

The panel 68 is spaced from and lies parallel with a corresponding panel 69 having identical contacts arranged in longitudinal rows $0_n$ to $12_n$ inclusive and horizontal rows $A_1$ to $K_1$ inclusive. In other words, immediately below each contact on the panel 68 there is a corresponding contact on the panel 69. A brush 70 lies between the panels 68 and 69 and extends crosswise thereof. It has brush portions (hereinafter described) insulated from one another and extending from one panel to the other. The brush 70 extends crosswise of the panels and is advanced in a step-by-step manner so that it first connects all of the contacts in row A of the panel 68 with the corresponding contacts in row $A_1$ of the panel 69, then connects the contacts in row B of panel 68 with the corresponding contacts in row $B_1$ of panel 69, etc. The brush 70 is so driven that it advances a number of steps depending on the length of the rug being printed, then moves back to its starting position and repeats the cycle.

For example, in printing the 12 ft. rug of Figure 1, the brush 70 would occupy eight positions, successively connecting the contacts in the rows A to H inclusive with the corresponding contacts in the rows $A_1$ to $H_1$ inclusive. Similarly, for the 10 ft. 6 in. rug of Figure 2 the brush 70 would occupy seven positions; whereas for the rugs of Figures 3 and 4 it would occupy five positions and four positions respectively.

In Figure 5 the machine is shown at that point in the operation where the spool for printing the sections $C'''$ is being shifted so as to travel in the proper alley for effecting the recombination of design elements shown in the rug section $C'''$. As shown in Figure 5, the brush 70 is in such position as to connect the contacts in the row C with the corresponding contacts in row $C_1$. At this moment the contact $(C-9_m)$ is connected to the corresponding terminal $(C_1-9_n)$, thereby establishing a circuit to the magnet $65_9$.

The several contacts on the panel 69 are connected point for point with corresponding contacts on a panel $69a$. A wire 71 connecting the point $(C_1-9_n)$ with the corresponding point on the panel $69a$ is shown in Figure 5. There will be a corresponding wire for every point on the panel 69 except that the one contact in row $0_n$ is not connected to the panel $69a$. The contacts in the panel $69a$ are arranged in horizontal rows $1_p$ to $12_p$ inclusive, and in vertical rows $A_2$ to $K_2$ inclusive. The provision of the panel $69a$ is for convenience in wiring. As hereinafter described, the several controlling keys for the tripper are each effective for closing a number of electrical contacts and the connection between the key contacts and the panel 69 determines the spool pattern. The panel $69a$ is arranged alongside a panel 72 on which the keys are mounted, and by means of flexible connectors 73 the proper wiring can be readily effected.

The tripper is provided with a special key 74, arranged to direct a spool 40 down zero alley (no print) or number one alley (border repeat), and a plurality of keys 75, each arranged to effect the printing of a unitary rug of a certain length. In Figure 5 the rug lengths for the different keys are shown. The key 74 is arranged to be raised or depressed, depending on whether it is desired to direct a spool into the no-print alley or into the border-repeat alley. The keys 75 are arranged only for depression. In Figure 5 the key for the 6 ft. rug is shown depressed.

Each key 75 is permanently connected through a brush 76 to a line wire $L_1$ and is provided with an extension bar 77, of brass or other suitable electrically conducting metal, carrying a number of spring contacts 78 thereon. Each key has a number of spring contacts corresponding to the number of unit printing lengths making up the rug of the length corresponding to that particular key. As above stated, the unit printing length ordinarily employed is 18 in., and the key for the 12 ft. rug will therefore have eight contacts 78, while the key for the 6 ft. rug will only have four such contacts.

Terminals 79 are provided in the panel 72, there being a terminal for each spring contact 78. When the rug printing keys are in their inactive position, the spring contacts are out of engagement with their corresponding terminals 79; but when a key is depressed (for example, the key for the 6 ft. rug in Figure 5), the several spring contacts on that key all engage the corresponding terminals and electrically connect the line wire $L_1$ therewith. The flexible connectors 73 lead from the terminals 79 to the terminals in the panel $69a$.

The four terminals 79 for the key for the 6 ft. rug have been lettered $a$, $b$, $c$, and $d$ in Figure 5. The terminal $a$ will be connected to a terminal in the row $A_2$ of the panel $69a$ and therefore (because the panels $69a$ and 69 are connected point for point) to a contact in the row $A_1$ of the panel 69. In practice the connection will be such that current flows from the line wire $L_1$ through the key structure to the terminal $a$, thence through the panel $69a$ and the connecting wire to the contact $(A_1-1_n)$. Therefore, when the brush 70 takes its first step and connects the contacts in the row A, the magnet $65_1$ will be energized and a spool will be directed into alley number 1 and will be effective for controlling the proper heads to print the cross border $A'''$ of Figure 4. Correspondingly, the terminal $b$ will be so connected that when the brush 70 bridges the contacts in the row $B_1$ with those in the row B, the magnet $65_2$ will be energized, thus causing a spool to be directed into the alley 2 and effect the printing of the section $B'''$. The terminal $c$ is, as above stated, so connected that when the brush 70 lies in the position shown in Figure 5 (horizontal row C) the magnet $65_9$ is energized, causing a spool to travel in alley number 9 to print the section $C'''$.

Summing up the prior description, the circuit through the terminal $c$ is as follows:—from the line wire $L_1$ to contact 76, thence through the bar 77 and spring contact 78 to the terminal $c$, thence through the wire 73 to the terminal $(C_2-9_p)$, thence through wire 71 to the corresponding contact $(C_1-9_n)$, thence through the brush 70 to the contact $(C-9_m)$, thence through the wire 67 to the magnet $65_9$, then through a wire 80 to the line wire $L_2$.

The terminal $d$ is so connected as to direct a spool into alley number 8 so as to print the section D''' of Figure 6.

The foregoing description covers the general features of construction and operation of the machine. The features of construction of the several units comprising the machine and the wiring and operation thereof will now be more specifically described.

Construction of printing heads

See particularly Figures 5 and 7.

The solid printing heads 20, together with the latching mechanism, are well known in the art and need not be particularly described. The solid printing heads and one type of latching mechanism therefor are fully described in the Jones and Webster Patent 1,263,900, and a magnet mechanism for operating the latches, such as shown in that patent, may be employed in connection with the solid heads 20. I prefer, however, to employ the magnet mechanism more particularly described and claimed in said Holt application above referred to.

The sectional heads are fully described and claimed in my Patent No. 1,756,268, but for convenience are here briefly described.

Each sectional head comprises a frame built about two I-beams 81 and arranged to be connected by pins 82 to the usual slides 83 of the printing machine. As is well known, these slides are mounted in ways 84 carried on the bed 85 of the machine.

The I-beams 81 carry castings 86 in which are mounted two cam shafts 87 connected by gearing 88 so that reciprocation of one cam shaft is effective for correspondingly reciprocating the other. Cams 89 are mounted along the shafts 87, there being a set of cams for each sectional block 24. Each block 24 is connected to a yoke 90 carrying follower rollers 91 engaging the cams 89. The control magnet 25 for each section is connected through a linkage, indicated generally by the reference character 92, to latches 93, as more particularly described in my patent above referred to. The mechanism is effective for holding the sectional block 24 in elevated position when the magnet is deenergized, or for permitting it to lower to printing position when the magnet is energized. In Figure 7 the head 23 is shown in its lowermost position and the blocks 24 are spaced above the web of material W which is to be printed.

The cams 89 are oscillated, so as to raise the sectional blocks from printing to non-printing position, by an arm 94 keyed to one of the shafts 87 and connected through a link 95 to a bracket 96 connected to the bed 85 of the machine. The reciprocation of the head by the head cams of the printing machine causes oscillation of the shafts 87.

Any desired number of sectional heads and solid heads may be used on the printing machine. Where solid heads are used they will be controlled from their corresponding panels 30 by circuits to the latch-up mechanism 21 as above described. The several sectional heads employed will be connected to their respective control panels by the flexible cables 28.

As shown in Figure 7, the terminals 27 of the cables 28 are provided with non-circular guide pins 27a, making it possible to connect the two parts of the terminals in only one way, thus insuring that a certain wire in the cable can only be connected to the proper head magnet 25 through the terminal contacts 27b. The terminals 29 are similarly constructed, so that unskilled men can connect the sectional heads to the control panels, the only skilled labor required for making the electrical connections being in the connection of the contacts 41 to the plates 42 and the terminals 79 of the key bank to the terminals on the panel 69a.

Head control mechanism

See particularly Figures 5, 8 to 15 inclusive, and 20.

The term "head control mechanism" comprehends the control panels 30, the chains 33, and all the mechanism associated therewith, but does not include the scissors mechanism for shifting the spools.

The control panels 30 are made of an insulating material, such as bakelite, and are mounted on bases 100 arranged to fit between spacing strips 101 extending between rails 102 forming a part of the framework of the machine. The several panels 30 are hingedly connected at 103 to a frame member 104. When the machine is in operation, the panels lie in parallelism with the bases 100 between the spacing strips 101, as best shown in Figures 8 and 12, but when it is desired to change the flexible connections on the panels, they may be lifted upwardly a short distance (the hinges being of such character as to permit this) and swung to the position shown in dot and dash lines in Figure 11, so that the panel faces are exposed to the workman.

The strips 32, which define the alleys 0 to 12 inclusive, are supported by the spacer strips 101, and the several rows of contacts 41 lie in vertical planes extending through the several alleys. Switch slides 105 are mounted on the panels 30 behind each row of contacts 41. The slides 105 are made of brass or other suitable conducting material, and are carried in blocks 106 of insulating material secured to the backs of the panels 30. Each switch slide 105 carries a plurality of spring contacts 107, there being a contact for each terminal 41. The slides 105 extend downwardly through slots in the edges of the bases 100 and are pivotally connected at 108 to rockers 109 pivoted to blocks 110 on the bottoms of the bases 100. Springs 111 normally urge the slides 105 to the inactive position shown at the right of Figure 13. As a roller 40 travels along any alley it successively engages the rockers 109 in that alley for successive panels and raises the switch slides 105, as shown at the left of Figure 13, thereby bringing the spring contacts 107 into engagement with the rear faces of the several terminals 41 in that particular row. The spools 40 have hubs 112 of insulating material and rims 113 of a metal. When a spool is in such position that it has raised the switch slide 105 to operating position, its rim is engaged by a fixed brush 114 (Figure 13), thereby electrically connecting the brush 114 with each of the contacts 41 in that particular row.

The spools must be stepped forward a distance corresponding to half the space between the panels 30 on each cycle of operation of the printing machine. In order to do this, the chains 33 are advanced in a step-by-step manner. The movement of the chains is effected by actuating the sprockets 37. These sprockets are keyed to a shaft 115 which carries a ratchet 116 adapted to be engaged by a pawl 117 on an arm 118. The arm 118 rocks freely on the shaft 115 and carries a pin 119 extending through a slot 120 in a link 121. The link 121 is reciprocated on each cycle of operation, as hereinafter described, and the slot 120 provides a lost motion connection such that at the proper instant in the cycle the arm 118 is rocked counter-clockwise so as to advance the chains one space interval equal to half the spacing of the panels 30. A detent roller 122 engages the teeth of one of the sprockets 37 so as to prevent reverse rotation of the shaft 115 when the link 121 rises and rotates the arm 118 clockwise prior to its next active movement.

The chains 33 move in fixed paths determined by guide bars 123 in a supporting frame 124. The rails 102 form the top members of this supporting frame, which carries all of the panels 30, the chain sprockets and the brushes 114.

In the illustrated embodiment of the invention there are 24 panels corresponding to a 24 head printing machine. The relation of these panels is best shown in Figures 11 and 12. There are 20 panels 30 for controlling "sectional" printing heads and four panels 30$_p$ for controlling solid or plain printing heads. The latter panels are of less height than the panels 30 (Figure 16). It will be understood, however, that in case there are less than twenty "sectional" heads and more than four plain heads to be used for printing a given pattern, the extra plain heads would be controlled by the panels 30 corresponding to the positions selected for the plain heads, by a single connection only on each panel 30.

The twenty-four panels are shown as grouped in two series of twelve each with an increased spacing between the groups. This corresponds to an arrangement of the printing heads on a printing machine of such length. In such arrangement, the motor and gearing are placed in the middle of the machine, thus "evening up" the torsional stresses, lost motions, etc., in the driving mechanism and insuring there will be no appreciable lag between the first and last heads. This driving mechanism requires extra spacing, which spacing is made a multiple of the regular center distance of the heads, so that the heads of the second series will register upon the goods being moved step-by-step as though the interval between the series were the ordinary pitch. The increased spacing on the tripper is then located at the corresponding point and is made the same multiple of the regular spacing as occurs in the printing machine.

In Figures 9 and 12 it is shown that the sprockets 36 are of such diameter relative to the pitch of the rods 34 and the spools 40 that the panel 30 which extends in a horizontal direction is in proper relation to the preceding and succeeding panels.

By reason of the fact that the sprockets 37 are used for driving, the chains 33 are under tension during their active travel, thus insuring accurate spacing apart of the spools 40. Any slackness in the chain is taken up in the loop 38.

Electrical connections for head control mechanism

See particularly Figures 5, 8, 16, 17 and 18.

The several brushes 114 are carried in supports 126 mounted on an insulating panel 127 which, in turn, is carried by the frame 124. The several brushes are connected by wires 128 (Figure 16) to a bus 129 leading from the line wire $L_1$. In practice a 20 volt circuit for the control mechanism has been successfully employed. Current at the proper voltage is supplied to the circuits extending from the line wires $L_1$ and $L_2$ by a transformer 130 connected to line wires $L_3$ and $L_4$.

When a spool 40 lies below a rocker 109, a circuit is established from the line wire $L_1$, through the bus 129, the wire 128, the brush 114, the rim of the spool 40, the rocker 109, and the slide 105 to the several contacts 41 in that particular row. These contacts are, as above described, connectible at will to the plates 42 through flexible connectors 44. The plates 42 are permanently connected to the terminal 29 and a circuit is established through the cable 28 to the several head magnets 25. Each head magnet 25 is connected to a wire 131 which leads back to the terminal 27 and is connected through the cable 28 to a wire 132 forming part of the return circuit. The wire 132 is connected to a bus 133 which leads through a relay switch 134 to the line wire L₂.

It will thus be seen that when the relay switch is closed and a spool 40 is in the position of Figure 16, those magnets on the head 23 of Figure 16 which have been connected to the terminals 41 by means of the flexible connectors 44 will be energized, thus causing the corresponding sectional blocks to be moved to printing position. Any number of connections between the several rows of contacts 41 and the plates 42 may be made so that the several magnets 25 may be energized in any one of a desired number of combinations, each combination being brought into operation by directing a spool down the proper alley.

The relay switch 134 is connected to the line wire L₃ by a wire 135. A wire leads from the magnet of the relay switch 134 to a brush 136, engaging a drum 137 on a shaft 138 of the printing machine. The drum 137 is of insulating material but has a metal face segment 139, so that during a desired portion of the revolution of the shaft 138 a circuit will be established from the line wire L₃ through the wire 135, the relay switch 134 and the brush 136 to the segment 139, and thence through a brush 140 to a wire 141 leading to the line wire L₄. The shaft 138 makes one revolution for each cycle of operation, and the drum 137 is effective for making a circuit through the head magnets only over a desired limited time period. This provision is made so that the head magnets will be energized only at the time when they are called into play to trip the latch mechanism of Figure 7.

The motion of the chains 33 is intermittent and there is a relatively long dwell between movements. The drum 137 permits of the flow of current through the spools, brushes and circuits only when the spools are at rest. This eliminates arcing between the spools and the brushes and between the spools and the rockers, and also prevents overheating of the magnets.

The control circuits for the magnets 22, which effect latching-up of the solid heads 20, are similar to those employed for the sectional heads, except that the flexible cables 28 need not be employed. The connection is direct from the plate 42a (Figure 16), through one of the wires 31 to the magnet 22. The other wire 31′ leads to the bus 133.

The spools 40 cannot move sidewise once they are properly entered in one of the alleys, but in order to insure that no harm will result if the shifting mechanism (the scissors) fails to function properly, I provide a safety means which stops the operation of the printing machine. This safety means is shown in Figures 17 and 18, and the wiring thereof is illustrated in Figure 16. It comprises a comb 142 mounted on a rocker 143 which is pivotally connected to the frame at 144. The teeth of the comb 142 lie in the same planes as the bars 32, and the spaces between the teeth correspond to the alleys 0 to 12. If a spool is properly positioned so as to enter any alley it will pass freely between the teeth of the comb 142, but if a spool is improperly positioned so that if the movement of the tripper were continued it would strike a strip 32, it will first engage a tooth of the comb 142 and raise it upwardly.

The rocker 143 on which the comb is mounted is connected through a link 145 to the operating arm 146 of a switch 147 in the control circuit of the main motor 148 for the printing machine. The tripper is driven from the shaft 138 geared to the printing machine and therefore the opening of the switch 147, which results in immediate stopping of the motor 148, will stop not only the printing machine, but also the tripper, so that no harm can result.

*Mechanism for setting spools*

See particularly Figures 5, 8, 12, 19 to 29 inclusive, 34 and 35.

As the chains 33 are stepped forward the spools 40 successively come to rest in position to be engaged by the sliding blocks 45 (see Figure 8). As above described they are, while the chains are at rest, shifted laterally to positions determined by the stops 57. It has been previously pointed out that the scissors arms 47 are opened to their fullest extent by a wedge cam 50 connected to a reciprocating bar 52. The bar 52 is slidably mounted in a frame member 149 (Figure 19), and is provided with a side extension 150 engaging a link 151. The link 151 is pivoted to a walking beam 152 (Figures 22-24), this walking beam being pivoted at 153 (Figure 12) to a standard 154 forming part of the framework of the tripper.

A block 155 and an arm 156 are secured to the bottom of the walking beam 152 so as to form a yoke between the arms of which there is slidably mounted a block 157. The block 157 is bored to receive the pin 158 of a combined crank and cam 159 mounted on the shaft 138 (Figures 19 and 28). Since the shaft 138 makes one revolution for each cycle of the machine, the walking beam 152 will be raised and lowered once in each cycle. The link 121, which effects the step-by-step movement of the chains, is also operatively connected to the walking beam 152 and therefore a downward movement of this beam is effective not only for spreading the scissors arms but also for advancing the chains and the spools carried thereby. It has been previously pointed out that the link 121 is connected to the rocker arm 118 (Figure 8) through a pin and slot connection 119, 120. By reason of this pin and slot connection, the scissors arms are spread apart just prior to the stepping forward of the chains 33, thereby insuring that there will be no interference between the slide blocks 45 and a spool 40 while it is moving into position to be shifted to the proper alley.

A safety device is incorporated in the connection of the link 121 to the walking beam 152. The link 121, instead of being directly connected to the walking beam, is pivoted at 160 to a bar 161 which lies on top of the walking beam 121 and is pivotally connected thereto at 162. Ordinarily the weight of the bar 161 is sufficient to actuate the rocker arm 118 and step the chains forward, but if for any reason the chains or their associated mechanism should jam, the lowering of the walking beam 152 will simply cause the bar 161 to pivot about its connection 162 and remain in an elevated position.

The scissors arms 47 have rounded tips 163 which lie in recesses formed in the slide blocks 45 (Figure 20). This eliminates any binding between the blocks and the scissors arms. The blocks are held in position on the cross bar 46 by a keeper bar 164. Those faces of the slide blocks 45 which are remote from the spools 40 engage the stops 57, and the faces of the slide blocks adjacent the spools 40 are recessed (Figure 21) so that when the relatively narrow stop 57 is engaged on each face by the slides there will be sufficient room for the relatively wider rim of the spool 40. The slides 57 are mounted in slotted guides 165 secured to a shelf 166 forming a part of the frame (see Figures 34 and 35).

The levers 58 which actuate the stops 57 make a pin and slot connection 167 therewith (Figure 22), and the levers themselves are pivoted at 59 in brackets 168 secured to the rear face of a panel 169 on which the magnets 65 are mounted. The control arms 60 are pivoted to the levers 58 at such point that the ends containing the slots 61 thereof slightly overbalance the other ends, thus causing the arms to normally lie in the inclined position of Figures 22 and 23. As has been previously described, the lifting bar 66 is effective for raising the control bars 60 so as to bring the slots 61 into position to be engaged by the cross bar 62. The lifting bar 66 is raised and lowered from the walking beam 152. The arm 156, which forms a part of the walking beam, is connected through a link 170 to a lever 171 which is pivoted to the framework 172. The lever 171 carries a pin 173 extending through a slot 174 in a link 175. The link is pivoted to a lever arm 176 on a rock shaft 177, carrying arms 178 on which the lifting bar structure is pivoted at 179. The lifting bar 66 is provided with two rearwardly extending arms 180 which are sufficiently heavy to offset the weight of the lifting bar proper, and any weight which may be imposed thereon by reason of raising the control bar 60. When the walking beam 152 is lowered, there is first a lost motion between the pin 173 and the link 175 by reason of the slot 174, and then the shaft 177 is rocked clockwise, as viewed in Figures 22 and 23, thereby raising the control bars 60 to the level position of the drawings. If for any reason a control bar becomes jammed, the cross bar simply moves counter-clockwise about its pivots 179, raising the arms 180. This is an additional safety feature.

At the time that the control arms 60 are raised to the level position, wherein they are engaged by the cross bar 62, said cross bar must be positioned above the slots 61. The cross bar forms the top of a frame made up of side arms 181 (Figure 25), a spreader 182 and the cross bar 62. This frame is pinned to a shaft 183 which normally occupies the position shown in Figures 22 and 23. A counterweight 184 is connected to the frame by a cable 185 running over a fixed pulley 186, the counterweight always urging the frame to the right, as viewed in Figures 22 and 23. The movement imparted by the counterweight is controlled by a finger 187, slidable through a guide 188 and carrying a follower roller 189 which engages the cam face of the combined crank and cam 159 on the shaft 138. As the shaft 138 rotates, the finger 187 is reciprocated, thus oscillating the frame and with it its cross bar 62 about the shaft 183. The shaft 183 is carried by the upper ends of links 190 pinned to a shaft 191 which is journaled in the framework of the machine. The cable 185 is connected to the frame between the finger 187 and the rock shaft 183, so that the shaft 183 normally tends to rest against a screw stop 192. If, however, the cross bar 62 should for any reason become jammed, the frame is free to rock about the cross bar, the rock shaft 183 moving to the left and away from the stop 192. This is a further safety feature.

The cam portion of the combined crank and cam 159 is so timed and the slot 174 is of such length that the bar 62 lies above the slots 61 when the lifting bar 66 is elevated. When this occurs the wires 63 raise the armatures 64 against the magnets 65 and if any magnet is energized at this moment, the corresponding control arm 60 is held in the level position after the lowering of the lifting bar 66, which immediately takes place. The other control arms 60 return to their normal inclined position. The cam then comes into play and engages the roller 189 so as to push the finger 187 and therefore the cross bar 62 to the left, thus rocking the corresponding lever 58 and pushing the stop 57 forward to engage the blocks 45 and determine the position to which the spool 40 is shifted.

The ends of the slots 61 are undercut and the edge of the bar 62 is correspondingly inclined so as to insure against the control arm 60 dropping out of engagement with the cross bar during movement. When the movement of the control arm 60 to the left is completed, the end of the control arm engages and rests on a shelf 193 which prevents it from dropping even after its magnet has been deenergized. On the return movement of the cross bar 62, the control arm is pushed back to its original position. If at the next operation its magnet is again energized, it will repeat the cycle, but if its magnet is deenergized and the magnet of another control arm is energized, then this latter control arm will move to operative position.

From the foregoing it will be seen that so long as the shaft 138 is rotated, the chains 33 with their rods 34 and spools 40 will be advanced in a step-by-step manner beneath the panels 30, closing different panel circuits depending on the particular alleys into which the spools have been directed. Furthermore, the spools will be mechanically shifted to enter the different alleys, depending upon which of the magnets 65 are energized.

*Key and panel mechanism for controlling the magnets 65*

See particularly Figures 5, 22, 26, 27, 30 to 33 inclusive, and 36 to 43 inclusive.

The general scheme of wiring and operation of the several keys and control panels, whereby the magnets 65 are controlled, has already been described in connection with Figure 5, and the operative circuit for one magnet at one step in the operation has been traced. The mechanical construction, whereby the brush 70 is moved and the number of steps which it takes, is determined, will now be described.

In printing a rug, the brush must occupy successive positions between the panels 68 and 69, the number of positions which it takes corresponding to the number of unit printing lengths in the rug. The brush starts from its cross-border printing position and thereafter a step is taken for each revolution of the shaft 138, each step corresponding to a unit printing length on the goods. A mechanical connection with the shaft 138 and effective for advancing the brush is therefore provided. This connection comprises (see Figures 22, 26 and 37) a link 194, connecting the lever 171 (which, it will be recalled, is oscillated on each revolution of the shaft 138) with one arm of a bell crank 195 pivoted to the frame at 196. The other arm of the bell crank lever carries a block 197 which is rockable about the axis of this arm of the bell crank lever and is pivotally connected to a link 198. The link 198 is pivoted to a block 199 (Figure 27), rockable about a pin 200 on an arm 201 pinned to a vertical shaft 202. The blocks 197 and 199 provide universal connections for the link 198. Reciprocation of the lever 171 is effective for rocking the shaft 202 first in one direction and then in the other.

At the upper end of the shaft 202 there is an arm 203 which is connected to a link 204 (Figures 36 and 37). The other end of the link 204 is engaged by a pin 205 carried in a slide 206. The slide 206 moves longitudinally of the tripper in ways formed in a fixed base 207. A pawl 208 is mounted on the pin 205 above the link 204, and is normally urged by a spring 209 into position to engage ratchet teeth 210 on a slide 211. The slide 211 moves on a fixed guide 212, secured to the base 207. A detent pawl 213 is pivoted to the base at 214 and is normally urged by a spring 215 to engage the teeth 210. The detent pawl 213 is shown in detail in Figure 43.

The shaft 202 is rocked through an angle such that on each oscillation thereof the slide 211 is advanced a distance equal to the spacing of the ratchet teeth 210.

The slide 211 carries a sidewise extending post 216 on which the brush 70 is mounted. The post 216 is braced at its outer end by an arm 217 carried on the slide 211.

The lateral rows $A_1$ to $K_1$ of the panel 69, and the lateral rows A to K of the panel 68, are spaced a distance corresponding to the spacing of the ratchet teeth 210. It follows that every time the shaft 202 oscillates, the brush 70 will be stepped forward so as to successively connect the lateral rows of contacts in the panels 68 and 69.

It has been previously pointed out that the brush must occupy a number of positions equal to the number of unit printing lengths contained in the rug to be printed, and the keys 74 and 75 are arranged to trip the slide 211 after it has taken a number of steps, determined by the depression of a particular key, and return it to its original position. In order to trip the slide 211, it is necessary to disengage the pawls 213 and 208 from the ratchet teeth 210. This tripping is effected by a bar 218 (see Figures 36 and 41). The bar 218 carries studs 219 extending through holes in the slide 211 and provided with springs 220 which urge the bar against a cam slide 21. The cam slide 221 lies in a recess formed in the bar 218 (Figure 37) and has inclined cam faces 222 engaging corresponding faces in the bottom of the slot.

The cam slide 221 is shown in detail in Figure 42. It is provided at one end with an upstanding portion 223 having a pin 224 projecting thereabove. The pin 224 is engaged by the forked end of a lever 225 (Figure 36) pivoted on top of the slide 211 at 226. The lever 225 is connected through a link 227 to a lever 228, pivoted on the slide 211 at 229, and having a finger 230 which is adapted to engage a lug 231 (Figure 37)

on any one of the keys 74 or 75 which happens to be depressed.

In operation, the oscillation of the shaft 202 steps the slide 211 forward until the finger 230 engages the key lug 231 on whichever key happens to be depressed, whereupon the lever 228 is swung counter-clockwise, as viewed in Figure 36, resulting in a corresponding swinging of the lever 225 and effecting a movement of the cam slide 221 to the left relative to the slide 211. Upon such movement the bar 218 is cammed outwardly and engages a pin 232 on the pawl 213, thus lifting the pawl out of engagement with the ratchet teeth 210. The pawl 213 has a heel 233 which strikes the rearwardly extending arm of the pawl 205 and lifts it out of engagement with the teeth 210, thus leaving the slide 211 free to return to its original position, which as above stated, is between the contact points A and $A_1$, thus starting a new cycle of operation. The return movement is effected by a counterweight 234 connected to the slide by a chain 235 (Figure 22, Figure 36).

The slide 211 is bored, as indicated at 236 (Figure 37, Figure 41), to receive a piston 237 on a fixed piston rod 238 secured at its rear end to the frame. When the slide is returned to its original position by the counterweight 234, air is compressed by the piston 237, its rate of escape being regulated by a pet cock 239. This arrangement constitutes a dash pot for controlling the rate of return movement.

When the cam slide 221 is moved to the left so as to release the slide 211 from the pawls 205 and 213, its end 240 is projected beyond the rear end of the slide 211, as shown in dotted lines in Figures 36 and 41. The return movement of the slide 211 is limited by a stop 241 on the frame. The cam slide 221 first engages this stop and is thereby caused to move to the right relative to the slide 211, thus resetting the levers 225 and 228 and permitting the spring 220 to retract the bar 218 to the first position. When the bar 218 is thus retracted, the springs 209 and 215 are again free to move the pawls into engagement with the teeth 210.

The construction of the brush 70 is best shown in Figures 32 and 33. It comprises a sleeve 242 freely rockable on the post 216 and surrounded by two grooved bars 243. These bars are fastened together by screws 244, and they are effective for holding in place brush contacts 245. The brush contacts are made of copper wires lying in slots formed in the sleeve 242 and the bars 243, as shown in Figures 32 and 33. When the screws 244 are tightened, the wires are all clamped in position. The sleeve 242 and the bars 243 are all made of insulating material, so that the several brush contacts are insulated one from the other. They are all of even length and project above and below the body of the brush, as shown. The brush portions 245 are effective for engaging the contacts in the panels 68 and 69, being stepped forward from one lateral row to the next as the slide 211 is advanced. Insulating strips 246 are provided on the panels 68 and 69 to separate the contacts in the several rows.

During the forward movement of the slide 211, the brush 70 is held with the brush contacts 245 in vertical position, as shown in solid lines in Figure 33. This is effected by a lever 247 on the sleeve 242, which lever is connected through a link 248 (Figures 22 and 36) to the rear end of the lever 228. When the finger 230 is tripped so as to return the slide 211 to its original position, the rotation of the lever 228 is effective through the link 248 for rocking the sleeve to the dotted line position of Figure 33, so that on the return movement the brush contacts do not engage the panel contacts. However, when the brush reaches its starting position between the contacts A and $A_1$, the resetting of the slide 221 is effective, through the lever 225, the link 227, the lever 228 and the link 248, for returning the brush to its operative position.

In the general description of the machine, it was stated that the key 74 is a special key effective for directing the spools down zero alley or number one alley so as to cause no printing or to cause repeated printing of the cross border, while the keys 75 are each effective for printing different length rugs.

It will be obvious that since the keys are spaced apart a distance corresponding to one step of movement of the slide 211, and since each step of movement controls the shifting of a spool 40 and hence controls the heads to print an 18 inch section on the web, the mere depression of any key 75 will result in the printing of a rug containing a number of printing lengths corresponding to the number of the key (key number 74 being quoted as number 1 key). For example, Figure 36 shows the fourth key depressed: This means that the brush 70 will advance three steps which, with the original cross-border printing position, equals four active positions, then return to its original position and repeat the operation as long as number 4 key remains depressed. The four unit printing lengths correspond to the rug length of six feet.

The several keys are slidably mounted in a bracket 249 and a yoke 250. They are each provided beneath the yoke with a washer 251. That portion of each key above its washer 251 is rectangular in cross section but from the washer downwardly each key is circular. The upper position of the washer relative to the key is therefore fixed. A compression spring 252 lies below each washer 251 and tends to urge the key upwardly and to return it to its normal position. The upward movement is limited by the washer 251 engaging the yoke 250. Each key is provided with a lug 253, engageable by an elongated latch 254, pivoted in the bracket 249 at 255 and effective for holding in depressed position any of the keys 74 or 75. The latch 254 is provided with an ear 256 and a pin 257 on a handle 258 extends therethrough. The handle 258 is provided with a flat spring 259 which engages a pawl 260. The pawl is pivoted in the bracket at 261 and is provided with a rearwardly extending portion 262 (Figures 39-40) having a slotted opening to receive the pin 257. The pawl 260 engages only the key 74. When a key is depressed, its lug 253 rides over the latch 254, which is snapped into position above the lug by the spring 259, thus holding that key in its lower position. This brings the lug 231 into alinement with the finger 230. If it is desired to change from one length rug to another, a key corresponding to the desired new rug length is depressed. Its lug 253 cams the latch 254 rearwardly from the keys, thus releasing the key which is then at its lower position, permitting the spring 252 for said key to move it upwardly to its normal inoperative position.

The key 74 is also arranged to be raised. This is accomplished by providing below the base 207 a yoke 263 having an opening in the bottom portion thereof through which a collar may freely move. A washer 251a lies over the collar 164, the washer being larger in diameter than the collar so that its downward movement is limited by the yoke 263. A spring 252a lies between the base 207 and the washer 251a. When the key 74 is depressed, the washer 251 moves downwardly, compressing the spring 252. The spring 252a is not affected, the collar 264 simply moving downwardly away from the washer 251a. When the key 74 is raised the collar 264 moves the washer 251a upwardly compressing the spring 252a. On this movement the spring 252 is not affected, the round portion of the key sliding upwardly through the washer 251. The springs 252 and 252a are placed under sufficient initial compression to insure rapid and full movement of the keys.

The key 74 is further provided with a lug 266 which lies in the path of the finger 230 when the key is raised. The key 74 therefore, whether in raised or lowered position, will permit but a one step cycle of movement of the brush 70. Starting from the position between the contacts A and $A_1$, oscillation of the shaft 202 will tend to advance it to a position between the contact rows B and $B_1$, but the finger 230 is immediately engaged by the lug 231 or the lug 266, depending on whether the key 74 is in raised or lowered position, tripping the pawls 213 and 208. As hereinafter described, the key 74 is so wired that when it is depressed it directs spools into number one alley, and when it is raised, it directs them into zero alley.

If the key 74 is depressed and a key 75 is thereafter depressed, such action is effective for returning the key 74 to its normal position. If, however, it is desired to move the key 74 from depressed to raised position or vice versa, the arm 258 is moved toward the key, thus retracting the pawl 260 and the elongated latch 254. The shifting of the arm 258 and the consequent freeing of the lugs 253 and 265 permits the springs for the key 74 to return it to normal position, and it is thereafter raised or depressed by the operator as desired.

Each key 74 and 75 is extended below the base 207 and carries a block 267 of insulating material having a brass facing 268 thereon. The bars 77 are electrically connected to the facings 268 and extend downwardly to engage the terminals 79 on the panel 72. The facing 268 is in engagement with the spring brush 76, which is mounted on a bracket 269, regardless of the position of the key. The key 74 does not have a bar 77 but terminates in the fixed block 267. When the key 74 is depressed it engages a spring brush 270 so as to establish a circuit from the brush 76 to the brush 270. When the key 74 is raised, the facing 268 engages a brush 271, thereby electrically connecting it with the brush 76.

The wiring for the key 74 is best shown in Figure 30. Considering first the key 74 in the raised position, it will be seen that current may flow from the line wire $L_1$ to the brush 76, thence through the key to the brush 271, thence through a wire 272 to the contact ($A_1$—$0_n$) on the panel 69. Therefore, when the brush 70 moves into position A it connects said terminal with terminal (A—$0_m$), energizing the magnet $65_0$ and causing a spool to be directed into zero alley. The circuit is completed from the magnet $65_0$ through the wire 80 to the line wire $L_2$.

When the key 74 is depressed, a circuit is established from the line wire $L_1$ through the brush 76 to the brush 270, and thence through a wire 273 to the contact ($A_1$—$1_n$) on the panel 69, and therefore, if, while the key 74 is depressed, the brush 70 moves to position A, connection will be made to the contact (A—$1_m$) on the panel 68, energizing the magnet $65_1$ and causing a spool to be directed into number one alley. So long as the key 74 remains depressed, the slide 211 will take but one step—to position A—and at each step will energize the magnet $65_1$.

Figure 30 also shows, in dotted lines, the connections between the panels 72 and 69a for the printing of the rugs shown in Figures 1 to 3 inclusive, and in solid lines the connections for the printing of the rug in Figure 4. It will be noticed that the top spring contact for each of the 6 ft., 7 ft. 6 in., 10 ft. 6 in. and 12 ft. rug keys is connected to the terminal ($A_2$—$1_p$), that the second contact 79, counting from the top, for each of these keys is connected to the terminal ($B_2$—$2_p$), and that the last terminal for each of these keys is connected to a terminal in the row $8_p$ and a number of rows forwardly of the panels which corresponds to the number of unit printing lengths in the different rugs. By tracing through the several circuits it will be found that the terminals on the panel 69a, which are connected to successive contacts 79, are arranged in the same order as are the spool patterns of Figure 6, and that therefore by simply connecting from the terminals 79 on the panel 72 to such terminals on the panel 69a as correspond to the desired spool pattern, the particular pattern which is to be printed may be predetermined.

It has been previously stated that the panel 69a is connected point for point with panel 69. This is shown in Figure 31.

The connections between the panels 72 and 69a are preferably made by flexible connectors having terminals adapted to engage the panel terminals. Where it is desired to connect one terminal on the panel 69a with a number of key contact terminals on the panels as, for example, the terminal ($A_2$—$1_p$), a flexible connector having a number of branches is employed.

Figure 6 illustrates diagrammatically the extreme flexibility of a printing machine having my improved rug tripper applied thereto. In this view the several horizontal lines correspond to the alleys 0 to 12 inclusive, and the spools for printing different length rugs are shown properly set up.

In printing the 12 ft. rug, the first spool goes into alley number 1 to print the cross border and the next is directed into alley number 2 to print the end section at the right-hand of the rug; that is to say, section B of Figure 1. The next spool goes into alley number 3 and controls the blocks which print the Maltese cross section. In section D there is a design figure which commences in the side border and extends into the field, and section E contains an extension thereof. The blocks for printing these sections are controlled by spools in alleys 4 and 5. Another border and field figure, appearing at the lower side of Figure 1, is printed in section F thereof, and this is controlled by a spool in alley number 6. A spool in alley number 7 controls the printing of section G containing the swastika, and a spool in alley number 8 controls the printing of the end section at the left-hand end of the rug. The rugs of Figures 2 and 3 differ from the rug of Figure 1 by the omission of certain of the sections thereof, and the spool patterns for such rugs are shown.

Between the 10 ft. 6 in. rug and the 7 ft. 6 in. rug, illustrated in the bottom portion of Figure 6, there is shown a defect of considerable width, and in order to obviate printing on this, a spool is directed into zero alley. Since the cross borders for adjacent rugs are printed from the same blocks, it will be necessary, after a spool has been directed into alley number 8 for printing section $G_1$ of the 10 ft. 6 in. rug, to depress the key 74 so as to print the cross border at the left-hand end of the 10 ft. 6 in. rug. The key 74 is then raised so as to omit the printing on a section of the web, and then, according to the showing of Figure 6, the key 75 for printing the 7 ft. 6 in. rug is depressed, resulting in setting up the spool pattern shown.

Between the 7 ft. 6 in. rug and the 6 ft. rug there is shown a border repeat which is obtained by depressing the key 74, so as to commence the printing of the 6 ft. rug beyond a defect which is sufficiently small to be included in the additional 18 inch section which has been interposed by pressing the key 74 to repeat the cross border. The spools for printing sections $A'''$ and $B'''$ of the 6 ft. rug correspond to the spools for printing the sections A and B of the 12 ft. rug and the sections $A^1$ and $B^1$ of the 10 ft. 6 in. rug. The spool for printing the section $C'''$, however, is directed into alley number 9 and there establishes the proper circuit for controlling the sectional blocks, so as to print the swastika and the Maltese cross in the same unit printing length. A spool in alley number 9, therefore, effects a recombination of the sectional blocks. In this particular series of rugs the alleys 10, 11 and 12 are idle.

From the foregoing it will be seen that the desired flexibility of the printing machine is obtained by operating the printing blocks in varying sequence, as shown by the spool patterns of Figure 6. Both the sequence of steps, as shown by the spool pattern, and the number of steps, are varied. Stated in another way, the space relationship between certain design elements applied by sectional or solid blocks is changed and various design elements are omitted. For example, the swastika of Figures 1 to 4, together with certain of the cross border portions, may be applied by different blocks on the same sectional printing head, and the dot in the center of the Maltese cross, as well as certain other of the cross border portions, may be applied by different blocks on another sectional printing head. Comparison of Figures 1 to 4 will show that under such circumstances there is a different sequence of operation for the sectional blocks on each of these two sectional heads, and in addition, the number of steps apart at which the swastika and the dot are printed will be varied as the rug design is varied.

I have illustrated and described the present preferred embodiment of the invention. It will be understood, however, that it is not limited to the form shown but may be otherwise embodied or practiced within the scope of the following claims:

I claim:

1. In the method of printing with a block printing machine having a head with sectional printing blocks, the steps consisting in printing with the blocks on a web of material to produce a desired pattern, operating the blocks on the head in a given sequence, and changing the sequence.

2. In the method of printing with a block printing machine having a plurality of heads with sectional printing blocks, the steps consisting in printing with the blocks on a web of material to produce a desired pattern, and operating the blocks on the several heads in sequences wherein the blocks print in different combinations at different times.

3. In the method of printing with a block printing machine having a head with sectional printing blocks, the steps consisting in printing with the blocks on a web of material to produce a desired pattern, operating the blocks on the head in a sequence containing a certain number of printing steps, and varying the number of steps.

4. In the method of printing with a block printing machine having a plurality of heads with sectional printing blocks, the steps consisting in printing with the blocks on a web of material to produce a desired pattern, operating a sectional block on one head to print one design element on the web, operating a sectional block on another head to print another design element, and varying the design by varying the number of steps apart that said blocks are operated.

5. In the method of printing with a block printing machine having a plurality of heads with sectional printing blocks, printing with a block section on one head, printing with a block section on another head, so timing the printing action of the heads that the patterns printed lie in a desired space relation, and changing such space relation.

6. In the method of printing with a block printing machine having a plurality of heads with sectional printing blocks, printing with a block section on one head, printing with a block section on another head, so timing the printing action of the heads that the patterns printed lie in a desired space relation, and changing such space relation so as to bring the patterns printed by said block sections in the same unit printing zone.

7. In the method of printing with a block printing machine having a plurality of heads with sectional printing blocks, the steps consisting in printing with a plurality of blocks on one head in a unit printing area, printing with a plurality of blocks on another head in another unit printing area, and producing a changed design by printing with certain only of the blocks on the several heads in the same unit printing area.

8. In combination with a printing head having sectional blocks movable into and out of printing position and control means associated with different blocks for determining such movement, means for actuating the several control means in different sequences.

9. In combination with a printing head having sectional blocks movable into and out of printing position and control means associated with different blocks for determining such movement, means for actuating the several control means in different predetermined sequences.

10. In combination with a printing head having sectional blocks movable into and out of printing position and control means associated with different blocks for determining such movement, a plurality of movable actuating devices for the said control means, the pattern of the movable actuating devices determining the sequence of operation of the printing blocks, and means for automatically setting up a plurality of actuating device patterns.

11. In combination with a printing head having sectional blocks movable into and out of printing position and control means associated with different blocks for determining such movement, a plurality of movable actuating devices for the said control means, the pattern of the movable actuating devices determining the sequence of operation of the printing blocks, and means for automatically setting up a plurality of predetermined actuating device patterns.

12. In combination with a printing machine having solid heads and sectional heads, the sectional heads having a plurality of printing blocks thereon, means for selectively controlling the solid heads and the blocks of the sectional heads.

13. In combination with a printing machine having solid heads adapted to be depressed or to be latched up if it is desired that they shall not print, and sectional heads having a plurality of printing blocks thereon adapted to be moved into or out of printing position on the head, means for selectively controlling the latching up of the solid heads and the movement of the sectional blocks to printing position.

14. In combination with a printing machine having solid heads, magnetic means for latching up the solid heads, sectional heads having a plurality of printing blocks thereon, and magnetic means for controlling the movement of the sectional blocks into or out of printing position, means for selectively energizing the magnets.

15. In combination with a printing machine having solid heads and sectional heads, means for latching up the solid heads so as to hold them in non-printing position, the sectional heads being arranged to constantly reciprocate, and means on the sectional heads for moving the blocks thereof into or out of printing position, means for selectively controlling the latching up of the solid heads and the movement of the blocks on the sectional heads.

16. In combination with a printing machine having a frame, solid heads, and at least one sectional head reciprocable in the frame, magnetic means on the frame for latching up the solid heads and magnetic means on the sectional head for controlling the movement of the printing blocks thereon into or out of printing position, and a common means for controlling the magnets.

17. In combination with a printing machine having a frame, solid heads and at least one sectional head reciprocable in the frame, magnetic means on the frame for latching up the solid heads, and magnetic means on the sectional head for controlling the movement of the printing blocks thereon into or out of printing position, a common means for controlling the magnets, and a flexible connection between said control means and the magnets on the sectional head.

18. In combination with a printing machine having movable heads with a plurality of printing blocks thereon, the blocks being movable relative to the heads into or out of printing position, magnets for controlling the movement of the blocks, and a common control means for selectively operating the magnets on the several heads.

19. In combination with a printing machine having a plurality of movable heads having a plurality of blocks thereon movable relative to the heads into or out of printing position, magnets for controlling the movement of the blocks, connecting wires leading to terminals on the several heads, a common control means for the several heads, and flexible connections between the control means and the terminals on the heads.

20. In combination with a printing machine having a plurality of movable heads having a plurality of blocks thereon movable relative to the heads into or out of printing position, magnets for controlling the movement of the blocks, connecting wires leading to terminals on the several heads, a common control means for the several heads having wires leading to connecting terminals corresponding to the several head terminals, connections between the respective terminals, and means insuring that the terminals on the control means will be properly connected with the correesponding terminals on the heads.

21. In a rug tripper, a control panel having a plurality of sets of contacts, a relatively movable contact member effective upon movement for substantially simultaneously energizing the contacts in a set, a plurality of printing block control terminals, and means for selectively connecting the printing block control terminals with contacts in the sets.

22. In a rug tripper, a control panel having a plurality of sets of contacts, a relatively movable contact member effective upon such movement for substantially simultaneously energizing the contacts in a set, the contact member being movable in different paths and effective for actuating different sets of contacts depending upon the path selected, a plurality of printing block control terminals, and means for selectively connecting said printing block control terminals with contacts in the different paths.

23. In a rug tripper, a control panel having a plurality of sets of contacts, a relatively movable contact member effective upon such movement for substantially simultaneously energizing the contacts in a set, the contact member being movable in different paths and effective for actuating different sets of contacts depending upon the path selected, a plurality of printing block control terminals, means for selectively connecting said printing block control terminals with contacts in the different paths, and means for automatically selecting the path in which the contact member travels.

24. In a rug tripper, a plurality of control panels, the several control panels having a plurality of sets of contacts and a plurality of printing block control terminals, relatively movable contact members effective upon movement for substantially simultaneously energizing the contacts in a set, and means for selectively connecting the printing block control terminals on the several panels with different contacts in the sets of contacts thereon.

25. In a rug tripper, a plurality of control panels, the several control panels having a plurality of sets of contacts and a plurality of printing block control terminals, relatively movable contact members effective upon movement for energizing sets of contacts on the several control panels, and means for selectively connecting the printing block control terminals on the several panels with different contacts in the sets of contacts thereon, the control panels being so arranged that the face of different control panels may be exposed for facilitating such connections.

26. In a rug tripper, a plurality of control panels, the several control panels having a plurality of sets of contacts and a plurality of printing block control terminals, relatively movable contact members effective upon movement for energizing sets of contacts on the several control panels, the several contacts in a set being substantially simultaneously energized, and means for selectively connecting the printing block control terminals on the several panels with different contacts in the sets of contacts thereon, the panels being arranged in parallel alongside the path of the contact members.

27. In a rug tripper, a plurality of control panels, the several control panels having a plurality of sets of contacts and a plurality of printing block control terminals, relatively movable contact members effective upon movement for energizing sets of contacts on the several control panels, and means for selectively connecting the printing block control terminals on the several panels with different contacts in the sets of contacts thereon, the panels being arranged in parallel alongside the path of the contact members but being hinged to permit of swinging the panels to a position to facilitate said selective connecting.

28. In a rug tripper, a control panel having a plurality of sets of contacts, a movable contact member effective upon movement for substantially simultaneously energizing the contacts in a set, a plurality of alleys through which the contact member may move, there being different alleys for different sets of contacts, a plurality of printing block control terminals, and means for selectively connecting said control terminals to different contacts in the several sets.

29. In combination with a printing machine having solid heads and sectional heads, a tripper comprising control panels, movable contact members effective for energizing different contacts on different control panels, connections with certain of said control panels effective for latching up the solid heads, and connections with other control panels effective for controlling the sectional heads.

30. A rug tripper comprising a plurality of control panels having contacts arranged in sets, contact members movable in different paths and effective for actuating sets of contacts in the several panels, the several contacts in a set being substantially simultaneously actuated, and means for causing the contacts to move along the paths in a plurality of predetermined orders.

31. A rug tripper comprising a plurality of control panels having contacts arranged in sets, contact members movable in different paths and effective for actuating sets of contacts in the several panels, the several contacts in a set being substantially simultaneously actuated, means for moving the contacts to different paths and means for actuating the last mentioned means so as to move the contacts into the different paths in varying sequences.

32. A rug tripper comprising a plurality of control panels having contacts arranged in sets, contact members movable in different paths and effective for actuating sets of contacts in the several panels, the several contacts in a set being substantially simultaneously actuated, means for moving the contacts to different paths, and a plurality of means each effective for imposing on the last mentioned means a sequence or order in which the contacts are disposed in different paths.

33. A rug tripper comprising a plurality of contacts arranged in different paths, contact members movable in the several paths, means for shifting the contact members to determine paths in which they shall travel, and electrical means for imposing on the last mentioned means a sequence or order in which the contacts are disposed in the different paths.

34. A rug tripper comprising a plurality of contacts arranged in different paths, contact members movable in the several paths, means for shifting the contact members to determine paths in which they shall travel, a plurality of stops for the last mentioned means, and an electrical control for the stops.

35. A rug tripper comprising a plurality of contacts arranged in different paths, contact members movable in the several paths, means for shifting the contact members to determine paths in which they shall travel, a plurality of stops for the last mentioned means, electrical actuating means for the several stops, and control means for actuating the electrical actuating means in desired order.

36. A rug tripper comprising a plurality of contacts arranged in different paths, contact members movable in the several paths, means for shifting the contact members to determine paths in which they shall travel, a plurality of stops for the last mentioned means, electrical actuating means for the several stops, and a plurality of control means effective for actuating the electrical actuating means in different desired orders.

37. A rug tripper comprising a plurality of contacts arranged in different paths, contact members movable in the several paths, means for shifting the contact members to determine the path in which they shall travel, a plurality of stops for controlling the shifting means, the stops being movable into or out of active position, and electrical means for effecting movement of the stops into active position.

38. A rug tripper comprising a plurality of contacts arranged in different paths, contact members movable in the several paths, means for shifting the contact members to determine the path in which they shall travel, a plurality of stops for controlling the shifting means, the stops being movable into or out of active position, and electrical means for effecting movement of the stops, the electrical means having a plurality of magnets selectable at the will of the operator and effective for causing movement of the stops to active position in different sequences.

39. A rug tripper comprising a plurality of contacts arranged in different paths, contact members movable in the several paths, means for shifting the contact members to determine the path in which they shall travel, a plurality of stops for controlling the shifting means, the stops being movable into or out of active position, and electrical means for effecting movement of the stops, the electrical means having a plurality of members selectable at the will of the operator and effective for causing movement of the stops to active position in different sequences, there being different numbers of steps in different sequences.

40. A rug tripper comprising a plurality of contacts arranged in different paths, contact members movable in the several paths, means for shifting the contact members to determine the path in which they shall travel, a plurality of stops for controlling the shifting means, the stops being movable into or out of active position, and electrical means for effecting movement of the stops, the electrical means having a plurality of members selectable at the will of the operator and effective for causing movement of the stops to active position in different sequences, the number of steps in the different sequences corresponding to the number of unit printing lengths in patterns which it is desired to print.

41. A rug tripper comprising a plurality of contacts arranged in different paths, contact members movable in the several paths, means for shifting the contact members to determine paths in which they shall travel, and electrical means for determining the amount of shifting.

42. A rug tripper comprising a plurality of contacts arranged in different paths, contact members movable in the several paths, means for shifting the contact members to determine paths in which they shall travel, and electrically controlled stop means for the several paths effective upon actuation for terminating the shifting of the contact members to such point as to travel in the path corresponding to the actuated stop means.

43. A rug tripper comprising a plurality of contacts arranged in different paths, contact members movable in the several paths, means for shifting the contact members to determine paths in which they shall travel, electrically controlled stop means for the several paths effective upon actuation for terminating the shifting of the contact members to such point as to travel in the path corresponding to the actuated stop means, and means for actuating the stop means in varying orders.

44. A rug tripper comprising a plurality of contacts arranged in different paths, contact members movable in the several paths, means for shifting the contact members to determine paths in which they shall travel, electrically controlled stop means for the several paths effective upon actuation for terminating the shifting of the contact members to such point as to travel in the path corresponding to the actuated stop means, and a plurality of pattern control means effective at will for actuating the stop means in different desired sequences.

45. In a rug tripper, a plurality of control members movable in different paths, means for shifting the control members to the desired paths, a plurality of stops for the shifting means, means for moving the stops, connections between the stops and the moving means, and means rendering desired connections effective.

46. In a rug tripper, a plurality of control members movable in different paths, means for shifting the control members to the desired paths, a plurality of stops for the shifting means, means for moving the stops, connections between the stops and the moving means, the connections being normally inoperation, and means rendering desired connections operative.

47. In a rug tripper, a plurality of control members movable in different paths, means for shifting the control members to desired paths, a plurality of stops for the shifting means, means for moving the stops, connections between the stops and their moving means, and a magnetic control for rendering desired connections effective.

48. In a rug tripper, a plurality of control members movable in different paths, means for shifting the control members to desired paths, a plurality of stops for the shifting means, means for moving the stops, connections between the stops and their moving means, a magnetic control for rendering desired connections effective, and means for operating the magnets in desired sequences.

49. In a rug tripper, a plurality of magnets to be controlled, connections controlled by the magnets for effecting desired printing steps, a pair of control panels, one of the panels having contacts arranged in rows, different rows of contacts being connected to different magnets, the other panel having corresponding contacts, electrical connections with the contacts of the last mentioned panel determining the pattern to be printed, and means for bridging the corresponding contacts of the two panels.

50. In a rug tripper, a plurality of magnets to be controlled, connections controlled by the magnets for effecting desired printing steps, a pair of control panels, one of the panels having contacts arranged in rows, different rows of contacts being connected to different magnets, the other panel having corresponding contacts, electrical connections with the contacts of the last mentioned panel determining the pattern to be printed, and means for bridging the corresponding contacts of the two panels in a step-by-step manner.

51. In a rug tripper, a plurality of magnets to be controlled, connections controlled by the magnets for effecting desired printing steps, a pair of control panels, one having a plurality of contacts, different contacts being connected to different magnets, the second panel having corresponding contacts, a pattern control means effective for establishing different pattern control circuits to contacts on the second panel, and means for bridging corresponding contacts on the two panels.

52. In a rug tripper, a plurality of magnets to be controlled, connections controlled by the magnets for effecting desired printing steps, a pair of control panels, one having a plurality of contacts, different contacts being connected to different magnets, the second panel having correspondng contacts, panel control means effective for establishing pattern control circuits to the second panel, the connections between the panel control means and the second panel being changeable as desired, and means for bridging the corresponding contacts on the panels.

53. In a rug tripper, a plurality of magnets to be controlled, connections controlled by the magnets for effecting desired printing steps, a pair of control panels, one having a plurality of contacts, different contacts being connected to different magnets, the second panel having corresponding contacts, a pattern control means effective for establishing different pattern control circuits to contacts on the second panel, and means for bridging corresponding contacts on the two panels in a step-by-step manner.

54. In a rug tripper, a plurality of magnets to be controlled, connections controlled by the magnets for effecting desired printing steps, a pair of control panels, one having a plurality of contacts, different contacts being connected to different magnets, the second panel having corresponding contacts, a plurality of pattern control means, each effective for establishing a pattern control circuit to the second panel, means for bridging corresponding contacts on the two panels in a step-by-step manner, and means limiting the number of steps depending on which pattern control means is then effective.

55. In a rug tripper, a plurality of magnets to be controlled, connections controlled by the magnets for effecting desired printing steps, a pair of control panels, one having a plurality of contacts, different contacts being connected to different magnets, the second panel having corresponding contacts, a bank of keys each effective for controlling circuits whereby desired contacts in the second panel are brought into circuit, and means for bridging corresponding contacts on the two panels.

56. In a rug tripper, a plurality of magnets to be controlled, connections controlled by the magnets for effecting desired printing steps, a pair of control panels, one having a plurality of contacts, different contacts being connected to different magnets, the second panel having corresponding contacts, a bank of keys each effective for controlling circuits whereby desired contacts in the second panel are brought into circuit, and means for bridging corresponding contacts on the two panels in a step-by-step manner, there being a connection between the bridging means and the keys whereby the number of steps taken by the bridging means is dependent upon the particular key selected.

57. In a rug tripper, a plurality of control members movable in different paths, means for shifting the control members so as to travel in the different paths, and means for stopping the tripper if a control member is improperly positioned to travel in a path.

58. In a rug tripper, a plurality of control members movable in different paths, means for shifting the control members so as to travel in the different paths, and means engageable by a control member for stopping the tripper if a control member is improperly positioned to travel in a path.

59. In combination, a block printing machine having controllable printing blocks and a driving motor, a tripper selectively controlling the operation of the printing blocks, and means for stopping the motor upon improper action of the tripper.

60. In a rug tripper, a plurality of control members movable in different paths, means for shifting the control members so as to move in desired paths, the point at which the control members are shifted being spaced from the ends of the paths, and safety means interposed between the point where the control members are shifted and the ends of the paths.

61. In a rug tripper, a plurality of control members movable in different paths, means for shifting the control members so as to move in desired paths, and safety means including a comb having teeth between which normally positioned control members may move, but the teeth being engageable by an improperly positioned control member.

62. In a rug tripper, a plurality of control members movable in different paths, means for shifting the control members so as to move in desired paths, safety means including a comb having teeth between which normally positioned control members may move, but the teeth being engageable by an improperly positioned control member, and a switch for controlling the tripper operatively connected to the comb.

63. In a rug tripper, a panel, magnets to be controlled, switching means for establishing circuits between the panel and the magnets, and a plurality of means under the control of the operator effective for energizing different contacts in the panel.

64. In a rug tripper, a panel, magnets to be controlled, switching means for establishing circuits between the panel and the magnets, and a plurality of keys under the control of the operator effective for establishing different circuits to the control panel.

65. In a rug tripper, a control panel, a plurality of magnets to be controlled, there being magnets for controlling the printing of field portions of a rug, a magnet for controlling the printing of a cross border, and a magnet for so controlling the printing machine that no printing will take place, means for establishing circuits from the control panel to the magnets, and a plurality of keys effective for energizing different contacts on the control panel, there being different keys corresponding to different length rugs, and there being one key effective for establishing at will a circuit to the magnet for controlling the cross border, or the magnet effective for causing the machine not to print.

66. In a rug tripper, a control panel, a plurality of magnets effective for controlling the printing, a brush movable in a step-by-step manner for establishing circuits from the control panel to the magnets, means determining the number of steps which the brush takes, and means for returning the brush to its starting position.

67. In a rug tripper, a control panel, a plurality of magnets effective for controlling the printing, a brush movable in a step-by-step manner for establishing circuits from the control panel to the magnets, means determining the number of steps which the brush takes, means for returning the brush to its starting position, and means whereby the brush is prevented from establishing circuits to the magnets while returning to its original position.

68. In a rug tripper, a control panel, a plurality of magnets effective for controlling the printing, a brush movable in a step-by-step manner for establishing circuits from the control panel to the magnets, means determining the number of steps which the brush takes, means for returning the brush to its starting position, and means for rendering the brush effective for establishing circuits only on its step-by-step travel.

69. In a rug tripper, a plurality of keys effective for determining the printing of rugs of different lengths, magnets controlling the printing, a plurality of contacts associated with the different keys for determining different magnet control circuits, a contact panel and a brush movable over the contact panel and effective for completing the circuits.

70. In a rug tripper, a plurality of keys effective for determining the printing of rugs of different lengths, magnets controlling the printing, a plurality of contacts associated with the different keys for determining different magnet control circuits, a contact panel and a brush movable over the contact panel and effective for completing the circuits, the brush travelling a distance determined by the particular key selected by the operator.

71. In a rug tripper, a plurality of keys effective for determining the printing of rugs of different lengths, magnets controlling the printing, a plurality of contacts associated with the different keys for determining different magnet control circuits, a contact panel, a slide movable in a step-by-step manner, a brush carried by the slide and movable over the panel, the brush being effective for completing the circuits to the magnets, and means on the slide for engaging a key selected by the operator for limiting the number of steps of movement of the slide.

In testimony whereof I have hereunto set my hand.

HARRY A. WEBSTER.